United States Patent
Roche et al.

(10) Patent No.: US 8,296,208 B2
(45) Date of Patent: *Oct. 23, 2012

(54) METHOD AND SYSTEM FOR PROCESSING DATA RELATED TO A LIFE INSURANCE POLICY HAVING AN ACCELERATED BENEFIT

(75) Inventors: Stephen Roche, Simsbury, CT (US); Michael J. Roscoe, South Windsor, CT (US); Dawn M. LeBlanc, Farmington, CT (US); Christopher Benedict Cramer, West Granby, CT (US); Lisa Michelle Proch, North Haven, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/153,730

(22) Filed: Jun. 6, 2011

(65) Prior Publication Data

US 2011/0238453 A1    Sep. 29, 2011

Related U.S. Application Data

(63) Continuation of application No. 12/001,912, filed on Dec. 13, 2007, now Pat. No. 7,958,035.

(60) Provisional application No. 60/875,415, filed on Dec. 14, 2006.

(51) Int. Cl.
*G06Q 40/00* (2012.01)
(52) U.S. Cl. .............................................. 705/35; 705/4
(58) Field of Classification Search .................. 705/4, 35
See application file for complete search history.

(56) References Cited

U.S. PATENT DOCUMENTS

| 5,926,800 | A | 7/1999 | Baronowski et al. |
| 6,275,807 | B1 * | 8/2001 | Schirripa ................ 705/36 R |
| 7,260,548 | B1 | 8/2007 | Allsup |
| 7,324,950 | B2 | 1/2008 | Sherman |
| 7,343,310 | B1 * | 3/2008 | Stender ........................ 705/4 |
| 7,457,776 | B1 | 11/2008 | Caruso et al. |
| 7,702,527 | B1 | 4/2010 | Kron et al. |
| 2002/0103678 | A1 | 8/2002 | Burkhalter et al. |
| 2007/0185741 | A1 | 8/2007 | Hebron et al. |
| 2008/0167903 | A1 | 7/2008 | Hall et al. |

OTHER PUBLICATIONS

Warren S. Hersch, Weighing the Merits of Settlement Options, Nov. 14, 2005, National Underwriter, pp. 1-2.*
Unknown, Deduction of Long Term Care Expenses, May 27, 1997, pp. 1-2.*
Emma Thelwell, How to protect yourself if illness strikes, Oct. 14, 2006, The Daily Telegraph, p. 5.
Faith Archer, A long spell off work can wreck your finances, Apr. 15, 2006, The Daily Telegraph, p. 5.
Richard Dyson, The mother who refused to give up, Mar. 19, 2006, Mail on Sunday, p. 13.

(Continued)

*Primary Examiner* — Ella Colbert
*Assistant Examiner* — Scott S Trotter
(74) *Attorney, Agent, or Firm* — Howard IP Law Group, PC

(57) ABSTRACT

Disclosed is a novel insurance product that provides an accelerated death benefit to the insured individual. The insurance product contains a lifeaccess accelerated benefit feature that allows the insured individual to file a claim and receive benefits under a life insurance product if the insured individual becomes chronically or terminally ill.

24 Claims, 9 Drawing Sheets

OTHER PUBLICATIONS

Unknown, CIGNA Introduces Insurance for Coping with Critical Illness, Apr. 29, 1998, PRNewswire, p. 1.

Roger J. Stalowicz, Critical Illness Life Insurance : Innovation to address a need, Sep. 1998, Journal of the American Society of CLU & ChFC, vol. 52, Issue 5, p. 54.

Harvey W. Rubin, Dictionary of Insurance Terms, 2000, Barron's Educational Series, Inc., Fourth Edition, p. 136-137.

Mark Leahy, The Importance of Being Covered, Charter, Spring 2004, vol. 1, Iss. 1, Sydney, AU, p. 46, 2 pages.

Bruce Cohen, Combination Policy Funds Life Disability Insurance, Universal Structure Provides Funding, Tax Advantages, National Post, Mar. 25, 1999, Don Mill, Ontario, Canada, p. D 4., 3 pages.

Edmund Tirbutt, Outblook Bright for Umbrellas, Mail on Sunday, Oct. 17, 1999, London, UK, p. 26, 2 pages.

Linda Koco, Provident L&A Adds disability Rider to Term Plans, National Underwriter, Oct. 5, 1998,vol. 102, Iss. 40, p. 25, 3 pages.

Huntley, Kennes C.; Life Insurance, Imminent Death and Accelerated Benefits; Journal of the American Society of CLU&ChFC, v 48 No. 3, pp. 84-96; May 1994.

Accelerated Death Benefit/Living Benefit Rider Disclosure; ReliaStar Life Insurance Company, Minneapolis, MN; Order # 141228, Dec. 1, 2006, 1 page.

Fornero, Elsa et al.; Developing an Annuity Market in Europe; Edward Elgar Publishing Limited, Cheltenham, UK; 2004; pp. 173-176.

Cary Lakenbach, Living Benefits Riders Get Fancy With LTC, Jun. 7, 2004, National Underwriter. Life & Health, pp. 30, 32.

Unknown, Guardian Expands Availability of Accelerated Death Benefit Rider, Mar 22, 2006, PR Newswire, New York, 2 pages.

Stephen M. Rice, No More Vanilla Life Insurance Policies: Try Accelerated Death Benefits, Jul 2006, Agent's Sales Journal, 2 pages.

Chuck Jones, New group benefit: Cash for illness, Aug. 1998, Life Association News. Washington: Aug. 1998. vol. 93, Iss. 8; p. 48, 1 page.

* cited by examiner

|  | Values Before Claim Payment | Values After Claim Payment |
|---|---|---|
| Base Face Amount | 100,000.00 | 93,800.00 |
| Term Rider On Base Face Amount | 0.00 | 0.00 |
| Account Value | 71,625.39 | 67,184.82 |
| Death Benefit** | 100,000.00 | 93,800.00 |
| Cash Value | 88,252.80 | 82,780.94 |
| Cash Surrender Value | 88,252.80 | 82,780.94 |
| Net Amount At Risk*** | 28,374.61 | 26,615.18 |
| Guideline Level Premium | 8,525.25 | 7,996.89 |
| MEC (7-Pay) Premium | 13,747.80 | 12,895.53 |
| No Lapse Guarantee Premium | 7,450.00 | 6,988.10 |
| Living Benefit Acceleration Percentage | 50% | 50% |
| Death Benefit Option (1, 2) | 1 |  |
| Lifetime Maximum Benefit Amount Remaining | 100,000.00 | 93,800.00 |
| Claim Payment | 6,200.00 |  |
| Reduction Ratio | 0.938 |  |

Figure 8

METHOD AND SYSTEM FOR PROCESSING DATA RELATED TO A LIFE INSURANCE POLICY HAVING AN ACCELERATED BENEFIT

CROSS-REFERENCE TO RELATED APPLICATIONS

This application is a continuation application of U.S. patent application Ser. No. 12/001,912 entitled ACCELERATED BENEFIT INSURANCE PRODUCT MANAGEMENT AND DISTRIBUTION SYSTEM AND METHOD, filed Dec. 13, 2007, now U.S. Pat. No. 7,958,035, which application claims priority to and benefit of U.S. Provisional Patent Application No. 60/875,415, filed Dec. 14, 2006, the entire contents of all of which are herein incorporated by reference for all purposes.

FIELD OF THE INVENTION

The present invention generally relates to the field of life insurance. More specifically, the present invention relates to the creation of an improved life insurance product that may be utilized to provide a flexible lifeaccess accelerated benefit.

BACKGROUND OF THE INVENTION

Individuals purchase insurance products for a variety of reasons, whether it is simply to ensure payment of funeral services, to provide additional income to the individual's family in case of an accident, or to provide financial security to a loved one. A life insurance policy may cover a single insured or may cover two insureds where the death benefit is paid on death of the second insured ("survivorship insurance"). Corporations typically purchase or sponsor insurance products as a financing vehicle for benefit plans or to hedge against other liabilities. Consequently, there are a variety of different types of life insurance products available for purchase.

There are two basic types of life insurance, these two types are known as term insurance and permanent insurance.

Term life insurance provides a predetermined benefit payment for a specifically, designated period (e.g. for one, five, ten, or fifteen years). The insurer only pays the face value if the insured dies within the period in which the policy is in effect. If the insured lives longer than the term of the policy, the policy expires and the insurer pays nothing. Consequently, term life insurance does not build any cash value. As a result, this type of insurance is inefficient and does not offer a good return.

The principal advantage of term life insurance is that it is relatively inexpensive. However, because of its speculative nature, term life insurance is usually purchased as a means of temporary protection or when an individual cannot afford the cost of other forms of life insurance. There are renewable and non-renewable term life policies. A renewable term life insurance policy automatically re-qualifies the insured, who is able to continue the existing policy when the original term is up. In contrast, upon expiration of a nonrenewable policy, the insured must take another physical and answer more health questions in order to re-qualify for a new policy.

In an effort to improve the characteristics of term life insurance, insurers offer riders or benefits to improve the policy's characteristics. For example, many term life insurance policies are convertible, which allow the owner to exchange the term policy into a permanent form of life insurance. However, the costs associated with the conversion are typically high thereby lowering the return on this type of policy.

Permanent insurance provides lifetime coverage. Permanent insurance may be embodied in a variety of different forms, the forms may be whole life, universal life, and variable universal life. Whole life insurance provides lifetime protection as well as cash value. Typically, premiums remain at a fixed level throughout the insured's life or for a portion thereof (e.g. for 10 or 20 years). The cash value portion of a whole life insurance can build up on a tax deferred basis and the policy owner may access this cash value through loans or withdrawal. Accessing cash values is likely to reduce the policy's death benefit.

A whole life insurance policy may be surrendered for its cash value but may be subject to a surrender charge. Premiums paid into a whole life insurance policy are used to pay the cost of protection and a portion of the premiums is held in the insurance provider's general account where it earns interest.

Universal life insurance is another variation of permanent insurance. Universal life insurance, typically, provides more flexible benefits than whole life insurance. A policy owner can adjust the premium payments and/or death benefits of the policy to suit their needs. As with whole life insurance, a portion of premium is held in the insurance provider's general account where it earns interest. This allows the potential for cash value to accumulate. The cash value is accessible to the policy owner for loans and withdrawals.

Variable life insurance is the third form of permanent life insurance. As with other insurance policies, part of the premium payment goes toward the term life portion of the policy, part to administrative expenses, and part to the investment or cash value portion of the policy. The principal difference between variable life insurance and other types of insurance is that the owner is able to actively choose how to allocate the premiums in the investment portion of the policy. The owner typically may select from an array of investments options offered under the policy. As a result, there is a potential for a strong return. Typically, a policy owner may choose from a variety of investment options that each invest in a mutual fund. However, variable life insurance is generally more expensive than other forms of life insurance, and death benefits may fluctuate up or down depending on investment performance.

Variable life insurance policies address the perceived disadvantages of whole life insurance. Premiums are flexible and the internal rate of return may be higher because it moves with the financial markets. Whole life insurance is guaranteed to remain in force for as long as the required premiums are paid on a time. However, universal and variable life insurance, will typically lapse if there is not enough cash value to cover the policy's expenses.

Other types of insurance are well known in the art and have been designed to address other consumer needs. For example, long term care insurance provides a benefit payment to help pay for long term care costs as long as the covered individual meets certain prerequisites. In practice, these insurance policies can be structured similarly to life insurance. That is, the insured pays a predetermined premium for a specified amount of coverage. The difference between the forms of coverage lies in the different events that are covered by each type of insurance.

Generally speaking, the younger and healthier a person is, the cheaper it is to obtain life insurance, disability insurance, and the like. Conversely, it is more expensive for an older individual to purchase these types of policies. As a result, the various policies covering illness, serious accident, disability, and death have widely varying premium payments and payouts. Consequently, an individual who desires protection from one or more of these events must purchase an individual policy for each specific event. In short, if an individual wishes to mitigate the risks associated with a serious accident, illness, disability, or death, the individual must purchase separate policies.

Not only are typical policies such as long term care policies expensive, but there are several disadvantages associated with them. That is, in order to receive benefit payments, typically a covered individual must be physically confined to a long term care facility (e.g. a nursing home).

SUMMARY OF THE INVENTION

The present invention relates generally to a novel life insurance product that provides both a traditional life insurance benefit and a type of accelerated benefit known as the lifeaccess accelerated benefit. The lifeaccess accelerated benefit is triggered when a covered individual receives a certification from a physician or any other qualified professional that the individual has an ailment which qualifies the individual to receive the accelerated benefit of the present invention. The covered individual does not need to demonstrate that they are confined to a facility or receiving care of any sort to receive benefit payments.

The individual also does not need to provide detailed accounting records to continue receiving benefit payments. For example, the individual preferably does not need to submit receipts for reimbursement. Rather, once a doctor has certified an ailment, the benefit is determined and paid out accordingly.

Importantly, the insured individual under the life insurance policy may be different from the owner of the insurance product. In addition, the named beneficiary under the life insurance policy may be a different individual than the owner. While the life insurance benefit is paid to the named beneficiary under the life insurance policy, the accelerated benefit is paid to the owner of the life insurance policy.

The life insurance product preferably comprises a face value, an account value, and an accelerated death benefit. In addition, as is known in the art, the life insurance product may include optional riders and/or a plurality of settlement options.

The face value may be the initial death benefit payable to a beneficiary and may change over time. The original value is determined by the purchaser and requires the payment of a premium amount. The face value of the product can be reduced by making an agreement, by making a withdrawal against the insurance policy, or by any other manner known in the art.

The account value comprises two primary components: a fixed account, and variable investment options. The fixed account offers a guaranteed rate of return and is part of the insurance provider's general account. The variable investment options are available through a separate account established under state law and has a fluctuating return rate. Charges relating to benefits of the life insurance product are deducted from these accounts, and net premiums that are designated to preserve the product are allocated to these accounts.

It is also contemplated that the present invention can further comprise optional riders, which are well known in the art. In the preferred embodiment, the present invention utilizes one or more of the following riders: an estate tax repeal benefit rider, an accidental death benefit rider, a waiver of specified amount disability benefit rider, a waiver of the monthly deduction rider, a cost of living adjustment rider, a policy continuation rider, a child rider, and an accelerated benefit rider. Of course, any other rider can be utilized in combination with the present invention.

The life insurance product of the present invention also allows the beneficiary to choose one or more settlement options for the death benefit once payment is due. In the preferred embodiment of the present invention, the settlement options available include a lump sum, interest income, payments of a fixed value, and payments for a fixed period.

The aforementioned features provide the present invention with a variety of flexibility features. For example, planned premiums are not required to be paid because the policy protection benefit insulates a purchaser from a potential lapse of the product. It is contemplated that premiums can be increased, decreased, stopped, or resumed. Furthermore, the death benefit may be increased or decreased at the option of the purchaser.

The present invention also discloses a method for providing a life insurance product with an improved rate of return. Initially, a life insurance product is constructed in a manner as disclosed above and is offered for sale to a purchaser. The purchaser chooses a face value for the policy in accordance with his/her desired level of risk, along with any optional riders that the purchaser wishes to include in the life insurance product. The purchaser then customizes the product by choosing an appropriate minimum death benefit.

A premium payment is calculated based on the purchaser's customization of the product. The purchaser then provides the premium payment and allocates it between the fixed account and the variable investment options.

Thus, the present invention overcomes the various deficiencies associated with the prior art by creating a novel insurance product that provides the purchaser with dual life insurance coverage and accelerated benefit coverage, as will become apparent from the detailed description below.

Accordingly, an object of the present invention is to provide an improved life insurance product.

Still another object of the present invention is to provide a life insurance product with an accelerated death benefit.

Yet another object of the present invention is to provide a life insurance product with an accelerated death benefit which may be combined with any type of rider and base policy, including a survivorship base policy.

Another object of the present invention is to utilize an accelerated death benefit which is triggered by an insured person being chronically ill or terminally ill.

Still another object of the present invention is the creation of a flexible accelerated death benefit for chronic illness.

Yet another object of the present invention is to utilize an accelerated death benefit rider that does not require meticulous accounting procedures.

Another object of the present invention is to offer an improved life insurance product for sale to a purchaser.

Still yet another object of the present invention is to provide the owner with the ability to collect benefit payments without actually requiring her to receive care.

Still another object of the present invention is to generate an accelerated access death benefit without the need for the insured to provide certification that he/she is receiving care, as well as not requiring that the insured must be confined to a long term care facility to receive benefit payments.

Yet another object of the present invention is to provide a policy or rider that is treated as an accelerated death benefit.

Other objects, features, and characteristics of the present invention, as well as the methods of operation and functions of the related elements of the structure, and the combination of parts and economies of manufacture, will become more apparent upon consideration of the following detailed description, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

FIG. 8 is an example of how the proportional reduction at the time of a benefit payment will affect the key insurance product values of an insurance product in accordance with an embodiment of the present invention.

DETAILED DESCRIPTION

Figure 1:
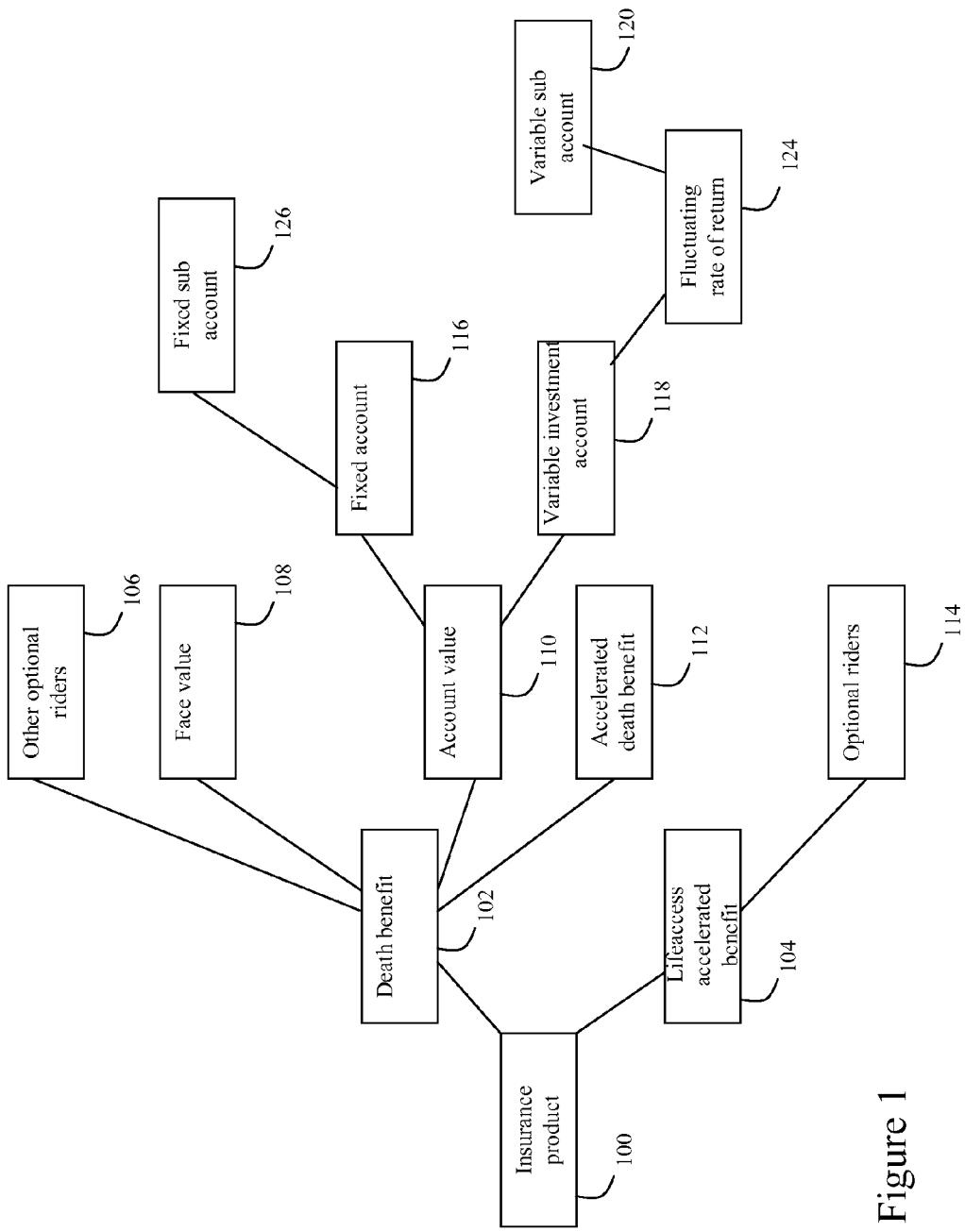
FIG. 1 is a structure diagram depicting the structure of an insurance product in accordance with an embodiment of the present invention.

A detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Moreover, well known methods, procedures, and substances for both carrying out the objectives of the present invention and illustrating the preferred embodiment are incorporated herein but have not been described in detail as not to unnecessarily obscure novel aspects of the present invention.

None of the terms used herein, including "product", "insurance policy", "policy", "insurance", "comprehensive insurance", "benefit", "accelerated benefit", "lifeaccess accelerated benefit", "accelerated death benefit", and "insurance product" are meant to limit the application of the invention to one type of insurance instrument. The terms are used interchangeably for convenience and are not intended to limit the scope of the invention.

Similarly, the use of the terms "company", "individual", "purchaser", "insured", "client", and "corporation" are not meant to limit the scope of the invention to one type of entity, as any entity or individual can also utilize the present invention.

Additionally, the use of the terms "insurance carrier", "insurance provider", "policy issuer", "insurance institution", and "insurer" are not meant to limit the scope of the invention to one type of entity. The terms are used interchangeably for convenience. The following presents a detailed description of a preferred embodiment of the present invention.

The present invention is an insurance product which pays a benefit to the policy owner if the insured is diagnosed with a chronic illness, defined as the insured's inability to complete two activities of daily living ("ADLs") without assistance, or a severe cognitive impairment. Furthermore, in one embodiment of the present invention the benefits may also be payable to an insured individual diagnosed as terminally ill. The definitions for chronic illness, ADLs, and terminal illness may vary from the definitions outlined herein and may be adapted as needed by a specific implementation of the accelerated death benefit without departing from the spirit of the present invention.

ADLs are defined as activities of basic human functional abilities which measure the insured individual's ability for self care and to live independently without substantial assistance from another individual. The following list of activities describes several examples of what may be considered as ADLs:

1. Bathing—the ability to wash oneself by sponge, bath or in either a tub or shower, including the task of getting into or out of the tub or shower.
2. Continence—the ability to maintain control of bowel or bladder function, or, when unable to maintain control of bowel or bladder function, the ability to perform associated personal hygiene, including caring for a catheter or colostomy bag.
3. Dressing—the ability to put on and take off all items of clothing and any necessary braces, fasteners or artificial limbs.
4. Eating—the ability to feed oneself by getting food into the body from a receptacle, such as a plate, cup, or table or by feeding tube or intravenously.
5. Toileting—the ability to get to and from the toilet, getting on and off the toilet, and performing associated personal hygiene.
6. Transferring—the ability to move into or out of a bed, chair or wheelchair.

It should be noted that the activities described above are not meant to be an exhaustive list of all possible ADLs. The above examples of possible ADLs are presented herein for illustrative purposes, as the insurance product may apply to a wide variety of activities considered to be ADLs without departing from the spirit of the present invention.

Importantly, even though some terminology used herein may refer to the accelerated death benefit of the present invention as accelerated death benefit for long term care service this is done for illustrative purposes only and does not define the scope of the present invention, as the present invention is defined solely by the claims. Thus, the accelerated benefits received under the present invention may be used at the discretion of the insurance owner, these benefits may be used for anything, and do not require that any long term care services are received.

Additionally, the insured individual, the owner of the insurance product and the beneficiary of the insurance product may be different individuals or groups. Thus, an individual may purchase an insurance product having a death benefit payable to another individual while maintaining access to the accelerated benefit for the owner.

Furthermore, in one embodiment the owner and the beneficiary under the rider implementation of the accelerated death benefit may be different than the owner and beneficiary of the underlying policy or death benefit. In such a case the beneficiary of the death benefit will receive the death benefit in the event of the insured's death minus any accelerated benefits received by the owner prior to the death of the insured.

The present invention provides accelerated payments of life insurance proceeds under conditions specified herein, this is known as the lifeaccess accelerated benefit. It is not intended to provide health, nursing home or long term care insurance. Thus an insured individual does not necessarily need to receive care to qualify for the benefits under the insurance product. Cash values, loan values if any, and death benefits may be reduced if the client receives accelerated benefits under this insurance product.

Furthermore, in one embodiment the accelerated benefit of the present invention may be considered as all or a portion of a death benefit insurance product and any term insurance amount available under the insurance product that the insurance provider will pay in advance when (a) the insured has been certified by a licensed health care practitioner as being chronically ill and (b) all of the other conditions for eligibility of benefit payments have been satisfied. In this embodiment the maximum amount that may be accelerated is the lifetime benefit amount.

The term benefit period as used herein refers to a period of time (e.g. not to exceed twelve consecutive months). This period may begin on the later of:
  (a) The date the insurance provider approves a request for an accelerated benefit.
  (b) The date all conditions for eligibility of benefit payments have been satisfied.
And ends on the earlier of:
  (a) The end of twelve consecutive months.
  (b) The date benefit payments end as described under the relevant provision.

The term chronically ill as used herein refers to an insured individual who has been certified by a licensed health care practitioner as any or all of the following:
  1. Being unable to perform (without substantial assistance from another individual) at least two activities for daily living for a period of at least 90 days due to a loss of functional capacity.
  2. Requiring substantial supervision from another individual to protect such individual from threats to health and safety due to a severe cognitive impairment.
  3. Needing services pursuant to a licensed health care practitioner's plan of care as set forth in the insurance product of the present invention.

The term cognitive impairment as used herein refers to the deterioration or loss of the insured individual's intellectual capacity which is confirmed by a licensed health care practitioner and measured by clinical evidence and standardized tests that reliably measure the insured's impairment in: short or long term memory, orientation as to person, place and time, deductive or abstract reasoning, or judgment as it relates to safety awareness.

The term licensed health care practitioner as used herein may refer to any physician (as defined in section 1861 (r) (1) of the Social Security Act) and any registered professional nurse, licensed social worker or other individual who meets such requirements as may be prescribed by the secretary of treasury. The licensed health care practitioner (1) may be acting within the scope of his or her license in the state of licensure when providing written certification or written recertification required by this rider; and (2) may not be the insured individual, or the insured's immediate family. Additionally, the term licensed health care practitioner as used herein may refer to any individual designated by the insurance provider as qualifying for such a classification.

The term lifetime benefit amount as used herein may refer to the maximum amount that may be accelerated during the lifetime of the insured individual and while the accelerated benefit remains in effect. The lifetime benefit amount may be equal to:
  1. The eligible amount multiplied by the lifeaccess specified percentage.
  Where:
  (a) Eligible amount on the policy date equals the initial face amount plus any term insurance amount covering the insured individual under the policy, thereafter eligible amount equals current death benefit plus any term insurance amount covering the insured under the policy.
  (b) Lifeaccess specified percentage equals 100% of the eligible amount, unless the insured individual elected the death benefit option at the time of application for the lifeaccess benefit, in which case the insured may select a percentage at that time, such percentage generally may not exceed 100% or result in a lifetime benefit amount of less than the minimum rules of the insurance provider in effect at the time the insurance product is generated. The lifeaccess specified percentage may remain fixed for the life of the lifeaccess benefit.

The term maximum monthly benefit as used herein may refer to the maximum amount the insured is eligible to receive on a monthly basis upon the approval of the insurance provider of a claim.

The term monthly anniversary as used herein may refer to the policy date and the same date in each succeeding month. The term monthly benefit amount as used herein may refer to the adjusted amount payable to the insured on a monthly basis upon the approval of the insurance provider of a claim, such amount generally will not exceed the maximum monthly benefit.

The term plan of care as used herein may refer to a written plan for care designed especially for the insured by a licensed health care practitioner specifying the services needed by the chronically ill insured. The term services as used herein may refer to the necessary diagnostic, preventive, therapeutic, curing, treating, mitigating and rehabilitative services, and maintenance or personal care services needed by a chronically ill individual.

The term substantial assistance means stand-by or hands-on assistance from another person without which the insured receiving such assistance would be unable to perform the ADLs.

The term stand-by assistance as used herein may refer to the presence of another person within arm's reach of the insured that is necessary to prevent, by physical intervention, injury to the insured while he/she is performing the ADL. The term hands-on assistance as used herein may refer to the direct physical assistance of another person.

The term substantial supervision as used herein may refer to continual supervision by another person to protect the insured from threats to health or safety due to severe cognitive impairment and may include cueing by verbal prompting, gestures, or other similar demonstrations.

The term waiting period as used herein may refer to a predetermined period of time (e.g. 90 consecutive-day period of time) that the insured must wait before becoming eligible for benefits upon becoming chronically or terminally ill. This period may begin on the date the insurance provider receives written certification from the insured individual by a health care practitioner that the insured is chronically ill as defined herein.

The term written certification as used herein may refer to written documentation obtained by the insured individual, at the insured's expense, from a licensed health care practitioner certifying that the insured is chronically ill as defined herein and specifying that services are likely to be needed for the rest of the insured's Life. Such written certification would generally have been made within the 12-month period preceding the date of each request for an accelerated benefit.

The term written re-certification as used herein may refer to written certification that the insurance provider may require from the insured periodically (e.g. annually) prior to the start of each benefit period following the initial benefit period in order for the insured to be eligible for an accelerated benefit payment in such subsequent benefit period, provided all other conditions for eligibility for benefit payments are met. Such written re-certification may be required to have been made within the 12-month period preceding the date of each request for an accelerated benefit.

The insured individual is eligible to receive an accelerated benefit if the insurance product is in force. Eligibility for the accelerated benefit may be required to meet any or all of the following requirements:
1. The insurance provider receives the insured individual's request, in writing, for an accelerated benefit.
2. The insurance provider receives from the insured individual written certification or written re-certification by a health care practitioner that the insured is a chronically ill individual.
3. The insurance provider completes, at the insurance provider's discretion and expense, a personal interview with, and an assessment of, the insured, including examination or tests by a licensed health care provider of the insurance provider's choice, and the insurance provider receives copies of any relevant medical records from a health care provider involved in the insured's care.
4. The insurance provider receives consent, in writing, of any assignee of record named under the insurance product or any irrevocable beneficiary named under the insurance product.
5. The insured satisfies the waiting period as described above.
6. If the insurance product is offered as a rider to a variable life policy, the insured individual fulfills requirements, if any, regarding limitations on the availability of certain sub-accounts while receiving benefit payments.
7. The insured is living at the time all of the above requirements are met.

The insurance provider may, at the insurance provider's expense, have the insured re-examined as often as the insurance provider may choose. The insurance provider may require a certification by a health care practitioner of the insurance provider's choosing prior to or during a benefit period to ensure that the insured is indeed chronically ill as defined herein.

The insured individual may elect to receive the accelerated benefit as a monthly or annual lump sum, benefit payment prior to the start of each benefit period. The maximum monthly benefit may be equal to the lesser of:
1. The lifetime benefit amount as of the start of the initial benefit period multiplied by the percentage shown in the additional benefits and rider section of the policy specifications.
2. The monthly equivalent of the per diem with a predetermined limit on the maximum per diem amount (e.g. limitation declared by the internal revenue service) not to exceed the daily benefit limit compounded on each policy anniversary.

The maximum monthly benefit may be calculated at the start of each benefit period and may remain fixed during that benefit period.

Benefits may not necessarily accumulate and may not necessarily be payable on a retroactive basis, except as noted under any relevant provision added by the insurance provider. At the start of each new benefit period, the insurance provider may recalculate the insured individual's monthly benefit amount and make any necessary adjustment so that such amount will equal the maximum monthly benefit. If the insured individual previously elected to receive less than the maximum monthly benefit as described below, the insured individual may at this time increase his/her monthly payments up to the maximum.

The amount of monthly benefit payable to the insured individual on a monthly basis will generally equal the maximum monthly benefit as described above, unless the insured individual elects to receive a lesser amount. This amount may be adjusted so that:
1. If the monthly benefit amount exceeds the lifetime benefit amount, the amount payable will be reduced to an amount that equals the lifetime benefit amount.
2. If, on the date the insurance provider approves the insured individual's request, there is a policy loan outstanding, a pro-rata reduction to each benefit payment will occur. Such reduction serves to repay a pro-rata portion of the policy loan. Rather than having the benefit payment adjusted, the insured individual may elect to repay the policy loan directly to the insurance provider.

At the start of each benefit period, the insured individual may elect to receive a monthly benefit amount that is less than the maximum monthly benefit, unless the insured individual elects to receive an annual lump sum payment, in which case the monthly benefit amount will equal the maximum monthly benefit. Choosing a lesser benefit amount could extend the period for which the insured individual is eligible to receive monthly benefit payments. Any amount the insured individual elects to receive that is less than the maximum monthly benefit is subject to the insurance provider's minimum rules in effect at the time.

The first accelerated benefit payment may be paid to the insured individual no later than the second monthly anniversary following the later of:
1. The date the insurance provider approves a request for an accelerated benefit.
2. The date all conditions for eligibility of benefit payments have been satisfied.

The first benefit payment, whether a monthly or annual lump sum payment, may include benefits payable retroactively for the period immediately following the waiting period during which the insured was eligible for an accelerated benefit, beginning on the day following satisfaction of the waiting period up to the date of the first benefit payment.

Subsequent benefit payments may be payable as follows provided all of the conditions for eligibility of benefit payments are met:

1. Monthly benefit payments may be payable on each monthly anniversary following the date of the first benefit payment.
2. Annual lump sum benefit payments may be paid at the beginning of each subsequent benefit period following the date of the first benefit payment.

The insurance provider may pay a proportionate amount of the benefit that is payable for less than a full month. Accelerated benefit payments may be paid until the earliest of the following to occur:

1. When the insured no longer meets any one of the conditions for eligibility for benefit payments.
2. When the insured individual notifies the insurance provider to discontinue the accelerated benefit payments.
3. When any of the events described under the rider termination provision occur.

In the event the insured individual requests the insurance provider discontinue accelerated benefits payments, and at a later date, the insured individual desires to resume such payments, the insurance provider may allow the insured individual to do so, provided all of the conditions for eligibility of benefit payment are met as specified in any relevant provision of the insurance product.

However, the insurance provider doe not require satisfaction of a new waiting period provided the insurance provider has on file written certification that is less than 12 months old. Payment of an accelerated benefit due to the insured's terminal illness, as provided under any accelerated death benefit rider that may be attached to the insurance product will cause the insurance provider to terminate this insurance product.

Acceleration of benefits under this insurance product may not necessarily affect the provisions or benefits of any accidental death benefit rider that may be attached to the insurance product.

After each benefit payment, the lifetime benefit amount in effect immediately prior to such payment may be reduced by each monthly benefit amount payable prior to any pro-rata reduction for loan repayments. In addition, each benefit payment may reduce the values and any no lapse guarantee premium in effect at the time of such payment when such values are multiplied by the following reduction ratio. This is discussed in further detail further on. However, for the purpose of this discussion a simplified version of the method used to calculate the reduction ration is presented below:

$$\text{Reduction Ratio} = 1 - (A/B)$$

Where:

A=is the monthly benefit payment, and
B=is the eligible amount immediately prior to a benefit payment.

The insurance product's current values that are reduced by each benefit payment based on the reduction ratio are as follows:

Face amount
Amount of any term insurance rider on the insured
Account value
Surrender charges
Indebtedness
Monthly no lapse guarantee premium
Cumulative no lapse guarantee premium
Cumulative premiums (paid to date)

If the present invention is offered as a rider, the insurance product to which the rider is attached may be any form of permanent life insurance, including a variable life policy. The insurance provider may reduce amounts in the fixed account and each relevant sub-account based on the proportion of the account value in the fixed account and each relevant sub-account to the amount accelerated. The insurance provider may limit the availability of certain sub-accounts while benefit payments are being made.

The insurance provider may send the insured individual a monthly report showing current values under the insured individual's policy, unless the insured individual elects to receive an annual lump sum payment, in which case the insurance provider will send the insured individual an annual report in accordance with the annual report provision of the insurance product. The insured individual may also contact the insurance provider to obtain current information regarding the insured individual's benefits under the insurance product at any time.

[If the insured individual makes a withdrawal under the insurance product during a benefit period, the accelerated benefit may terminate in accordance with any relevant rider termination provision.

The charge for the rider for any monthly activity date may be equal to the product of the following factors:

A. The cost of insurance rate per $1,000 for the insurance product.
B. The lifeaccess accelerated benefit factor, such factor never to exceed the maximum determined by the insurance provider for any additional benefits and riders.
C. The benefit size discount factor which may not be less than 0.1 or greater than 1.
D. The lifeaccess accelerated benefit rider amount at risk divided by $1,000.

The charge may automatically be deducted on each monthly activity date from the account value as part of the monthly deduction amount and may not exceed the maximum charge as determined by the insurance provider.

If the account value less indebtedness is insufficient to satisfy monthly deduction amounts while benefit payments are being made, the insurance provider may waive the portion of such deductions which exceed the account value less indebtedness to keep the insurance product from going into default until benefit payments are discontinued either by the insured individual or in accordance with the terms of the lifeaccess accelerated benefit.

The insured individual may elect to receive his/her monthly benefit amount as an annual lump sum prior to the start of each benefit period. The amount of the annual lump sum payment may equal the present value of the monthly benefit amount payable for each month in the twelve-month period following either the date the first monthly benefit payment would otherwise be payable, or the date of each subsequent benefit period.

Each monthly benefit amount payable will be discounted by a monthly rate, such rate derived from an annual interest rate, never to exceed the greater of the current yield on ninety-day treasury bills, or the current maximum statutory adjustable policy loan interest rate. Such discount may apply prior to any pro-rata adjustment to the monthly benefit amount payable for loan repayments. Only one annual lump sum payment will be made in any one twelve-month period.

In lieu of having the monthly or annual accelerated benefit payments paid by check which the insurance provider mails to the insured individual, the insured individual may instead elect to have an interest-bearing draft account (i.e. safe haven account) established in the insured individual's name, the insured individual may then write drafts as desired, subject to administrative procedures then in effect regarding initial and remaining balances and minimum draft amounts. The insurance provider may discontinue offering the safe haven account at anytime and in such event, any remaining balance in the safe haven account will be paid to the insured individual in one lump sum.

Policy provisions regarding incontestability apply to the insurance product of the present invention from its date of issue. The present invention may not necessarily provide an accelerated benefit for chronic illness resulting from:

1. Intentionally self-inflicted injury or attempted suicide, while sane or insane.
2. Any act or incident of insurrection or war, declared or undeclared.
3. The insured's participation in, or attempt to participate in, a felony, riot or insurrection.
4. Alcoholism or drug addiction.

In addition, the present invention may not necessarily provide an accelerated benefit if the insured or his/her licensed health care practitioner reside outside of the United States.

The insurance product of the present invention may terminate on the earlier of the following dates:

1. The date the insurance provider receives the insured individual's request, in writing, to cancel the insurance product.
2. The date the insured individual makes a withdrawal under the insurance product during a benefit period.
3. The date the policy terminates.
4. The date the insurance provider receives notification, in writing, of the death of the insured.
5. The date the insurance provider approves a request, in writing, from the insured individual to accelerate the death benefit for reason of terminal illness of the insured as may be provided under an accelerated death benefit.
6. The date the lifetime benefit amount is exhausted.
7. The date on which all additional benefits provided by rider are deemed to have terminated according to the terms of any termination and maturity date provision, continuation beyond the insured's age 100, or any relevant provision of the insurance product of the present invention, unless the insured individual is receiving benefit payments under the insurance product. In this event, benefit payments will continue until terminated.

In the event this insurance product terminates as described above, benefit payments may also terminate, unless the insurance product would otherwise terminate during a benefit period in accordance with item number 7 above. If this occurs, benefit payments will continue until terminated in accordance with the provisions of the insurance product of the present invention.

The insured individual may reinstate the insurance product of the present invention if canceled, whether as a stand alone policy or as part of an existing insurance product. Such reinstatement may be subject to satisfactory evidence of insurability and all other terms and conditions of any relevant insurance product.

As described above, the present invention may be structured as a stand alone policy or as a rider to an existing policy. The structure of the present invention may be capable of being applied to all products.

If the insurance product of the present invention is offered as a rider it is possible that, through the underwriting process, the client may be declined for this rider while being accepted for the base policy.

FIG. 1 depicts the general structure of an insurance product in accordance with an embodiment of the present invention.

The insurance product 100 is comprised of a death benefit 102 and a lifeaccess accelerated benefit 104. The lifeaccess accelerated benefit 104 is further comprised of any optional riders 114 chosen by the insured individual or group. The death benefit 102 is further comprised of any other optional riders 106 chosen by the insured individual or group, a face value 108, an account value 110 and an accelerated death benefit 112.

The account value 110 of the insurance product is further made up of a fixed account 116 and a variable investment account 118. The fixed account 116 further comprises a fixed sub account 126. The variable sub account 120 further comprises a fluctuating rate of return 124.

Figure 2:
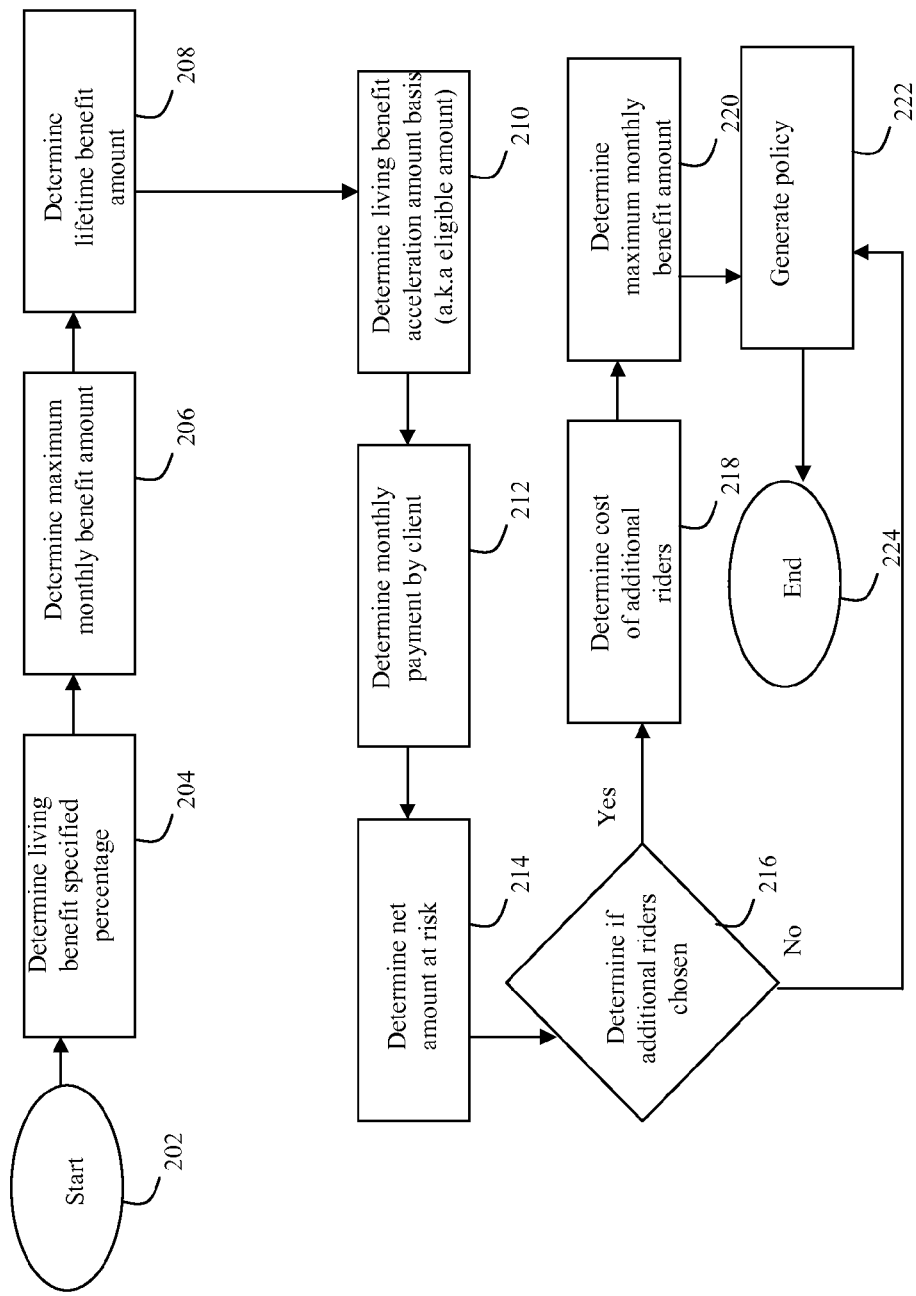
FIG. 2 is a flow chart depicting the steps taken when an insurance product is generated in accordance with an embodiment of the present invention.

FIG. 2 depicts the steps taken when generating the insurance product in accordance with the present invention by an insurance provider. The procedure starts in step 202, first the living benefit specified percentage is determined in step 204, next the maximum monthly benefit amount is determined in step 206. Subsequently, the lifetime benefit amount is determined in step 208, next the living benefit acceleration amount basis (a.k.a eligible amount) is determined in step 210. Upon the completion of step 210 the monthly payment to be made by the client is determined in step 212, subsequently the net amount at risk is determined in step 214. Next it is determined if additional riders are chosen in step 216, if additional riders are not chose the policy is generated in step 222 and the procedure ends in 224, if additional riders are chosen the cost of the additional riders is determined in step 218 and the maximum monthly benefit amount is determined in step 220, the policy is ten generated in 222 and the procedure ends in 224.

It is contemplated that when the insurance product of the present invention is generated the insured individual will select a living benefit specified percentage. Upon choosing this and any other relevant values the insurance provider calculates a maximum monthly benefit amount, a lifetime benefit amount, and a living benefit acceleration amount basis (also known as eligible amount). The insured individual may be charged for the insurance product of the present invention on a monthly basis, although any other payment scheme may be chosen without departing from the spirit of the present invention.

The charge for this rider may be determined using a tabular rate per $1000. This rate per $1000 may then be applied when calculating the net amount at risk, which may be calculated based on the overall policy's (including any riders) net amount at risk, the lifetime benefit at the time, and a variety of other factors. In the event that the provisions of the insurance product of the present invention are executed (i.e. the client goes on claim), these charges may continue.

Figure 3:
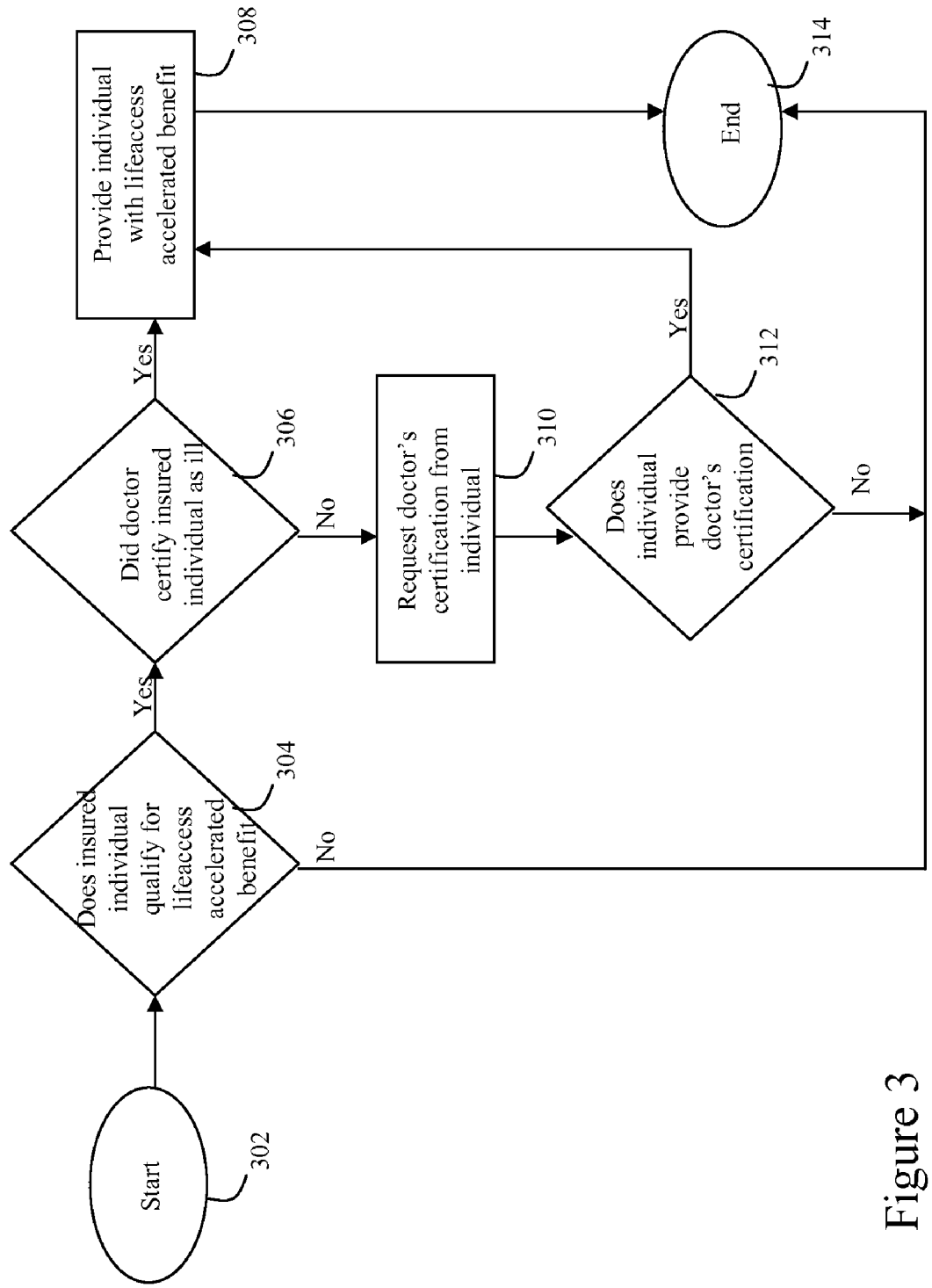
FIG. 3 is a flow chart depicting the steps taken when benefits are administered by an insurance provider in accordance with an embodiment of the present invention.

FIG. 3 depicts the steps taken when benefits are administered by an insurance provider in accordance with the present invention. The procedure starts in step 302, first it is determined if the insured individual qualifies for lifeaccess accelerated benefit in step 304, this may be done by checking the terms of the individual's insurance benefits and determine if such a benefit is included in the relevant insurance product.

If the insured individual does not qualify for the lifeaccess accelerated benefit the procedure ends in step 314, if the insured individual qualifies for the lifeaccess accelerated benefit it is determined if a doctor certified the insured individual as ill in step 306. If a doctor certified the insured individual as ill the lifeaccess accelerated benefit is provided to the insured individual in step 308, the procedure then ends in step 314. If a doctor did not certify the insured individual as ill, a doctor's certification is requested from the individual in step 310.

Subsequently, it is determined if the individual provided doctor's certification in step 312. If it is determined in step 312 that the individual provided doctor's certification, the individual is provided with the lifeaccess accelerated benefit in step 308, the procedure then ends in step 314. If it is determined in step 312 that the individual did not provide doctor's certification the procedure ends in step 314

In the event that an insured individual files a lifeaccess accelerated benefit claim, the insured individual may be paid on a monthly basis, a month's worth of maximum monthly benefit amount (or a different amount, if chosen by the client) until the insured individual is no longer paid a benefit under the claim or the lifetime benefit amount has been paid out of the insurance product. At time of a claim, the insured individual may have the option to either receive a monthly benefit amount that is less than the maximum monthly benefit amount, or receive his/her entire annual benefit in a single lump sum payment. The lump sum payment amount may be a value determined based on the maximum monthly benefit amount, the lifetime benefit amount and any relevant discount factors.

These options may also be provided to the insured individual on an annual basis, on a claim anniversary, and throughout the duration of the policy. Once the full lifetime benefit amount has been paid out under a claim, the death benefit on the policy may be defined to be the proportionally reduced death benefit going forward. Under these conditions no further benefit payments will be made.

The structure of the insurance product may be offered as a stand alone policy, or as a rider capable of being applied to all products. Preferably, the present invention may provide flexible benefit payments that may be eligible for tax favored treatment. The present invention pays a benefit to the policy owner if the insured is diagnosed with a chronic illness, which is defined to be the insured's inability to complete two ADLs without assistance, or a severe cognitive impairment.

It is contemplated that the account value of the present invention is recalculated and balanced on a periodic basis (e.g. monthly basis). Although in the preferred embodiment the account value of the insurance product is balanced and recalculated on a monthly basis, this may be done on a daily basis, whenever withdrawals occur, at the time of a claim, or at any other time, without departing from the spirit of the present invention.

Figure 4:
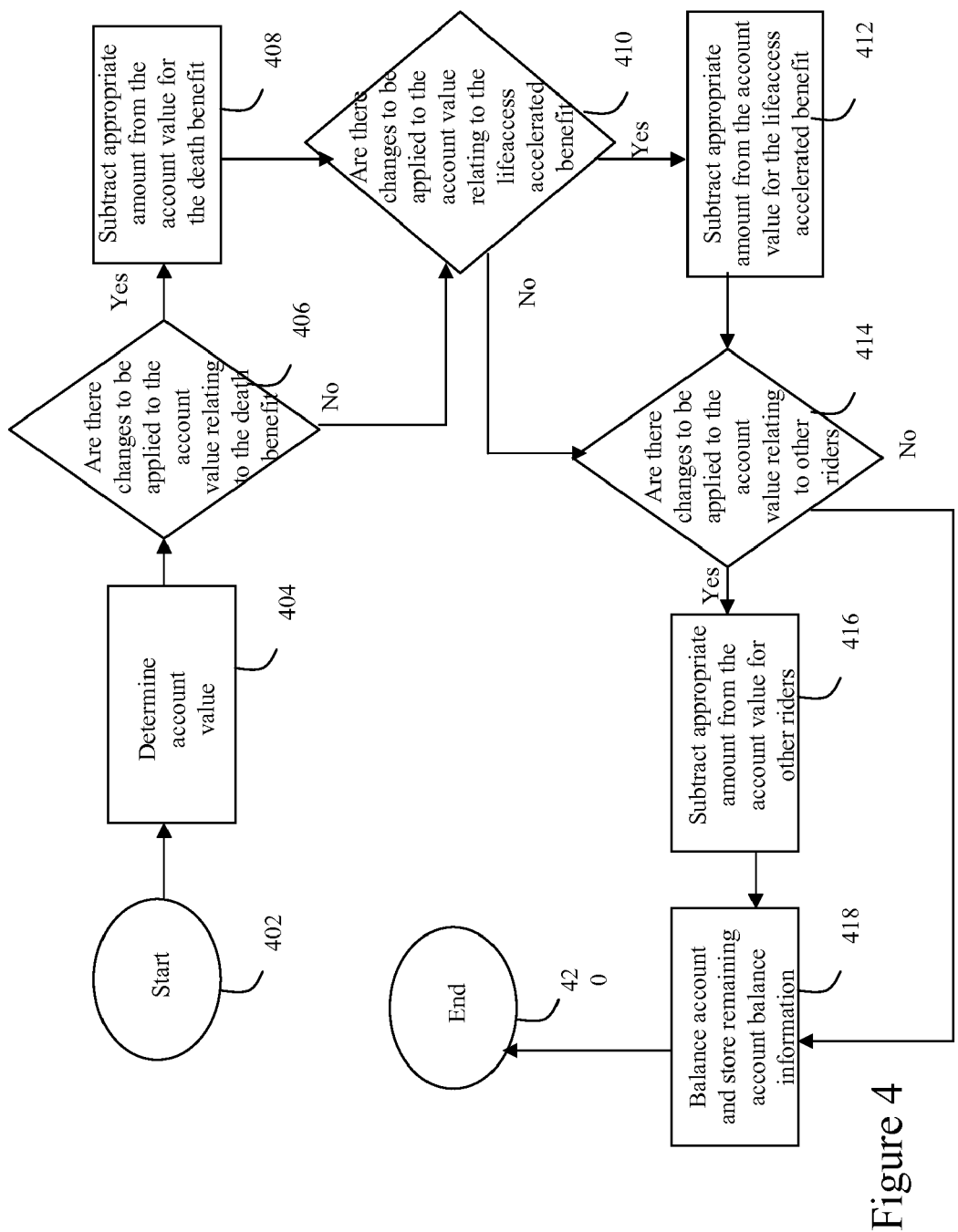
FIG. 4 is a flow chart depicting the steps taken when periodically balancing the account value in accordance with an embodiment of the present invention.

FIG. 4 depicts the steps taken when periodically balancing the account value in accordance with the present invention. The procedure starts in step 402, first the account value is determined in step 404, next it is determined if there are charges to be applied to the account value relating to the death benefit in step 406.

If it is determined that there are charges to be applied to the account value relating to the death benefit, the appropriate amount is subtracted for the death benefit from the account value in step 408, next step 410 is performed. If it is determined that there aren't charges to be applied to the account value relating to the death benefit in step 406 step 408 is skipped and step 410 is performed.

It is determined if there are changes to be made to the account value relating to the lifeaccess accelerated benefit in step 410, if it is determined that there are changes to be made in step 410 the appropriate amount is subtracted from the account value for the lifeaccess accelerated benefit in step 412, next step 414 is performed. If it is determined that there are no changes to be made in step 410, step 412 is skipped and step 414 is performed.

Next, it is determined if there are changes to be made to the account value relating to other riders in step 414. If there are charges related to other riders, the appropriate amount is subtracted from the account value for the other riders in step 416, next step 418 is performed. If it is determined that there are no changes to be made to the account value relating to other riders in step 414 step 4.16 is skipped and step 418 is performed. Finally, the account is balanced and the remaining account balance information is stored in step 418, the procedure then ends in step 420.

At the time that the insurance product is issued with this rider, the insured individual may be able to select the living benefit specified percentage as a whole percentage amount (e.g. 1%, 5%, 50%, 74%, 100%, etc.) The living benefit specified percentage may not be changed after issue. However, in an alternative embodiment it is conceivable that an adjustable or variable percentage is applied. The living benefit acceleration percentage may be applied, at any time, to the living benefit acceleration amount basis (eligible amount) to determine the lifetime benefit amount.

By default, the living benefit specified percentage will be set to 100%, meaning that the insured individual may accelerate 100% of his/her death benefit plus face amount on term rider under the insurance product of the present invention. The living benefit specified percentage allows the insured individual to accelerate less than his/her entire death benefit under the insurance product of the present invention.

The living benefit specified percentage may be used when determining the benefit amount payable and in the calculation of the charge for this rider. It will also come into play when determining how much benefit is left available after each benefit payment is made.

Minimum living benefit specified percentage for a death benefit option may be the lowest percentage that would result in a lifetime benefit amount greater than or equal to $100,000. The lifetime benefit amount may be set to any amount and is not limited to $100,000, this amount is presented herein for illustrative purposes only.

In the preferred embodiment, after issue, the living benefit specified percentage, as set, will remain fixed. However, a variable or adjustable percentage may be used without departing from the spirit of the present invention. The lifetime benefit amount may decrease to below $100,000 after issue of the insurance product of the present invention as appropriate, given the living benefit specified percentage and the policy's death benefit.

Alternatively, the maximum living benefit specified percentage may equal a 100% or any other percentage agreed upon by either the insurance provider, the insured individual, both parties or any other relevant party.

For the purpose of calculations the living benefit acceleration amount basis at any time t is defined as the sum of:
1. The current death benefit at time t.
2. The current face amount on the term rider on base insured at time t.

This value may be used in conjunction with the living benefit specified percentage to calculate the lifetime benefit amount. The lifetime benefit amount is the maximum amount of benefit that the insured individual will receive over the life of his/her claim under the present invention. It may, in part, be used to determine the length of time during which the benefit payments are made under this rider, in the event that the insured individual goes on claim under this rider. The lifetime maximum benefit may be calculated based on two factors:
1. Living benefit specified percentage.
2. Living benefit acceleration amount basis (also known as eligible amount).

At any time t before going on claim, the lifetime benefit amount is defined and calculated below along with some other key values defined in table 1 below:

| Variable | Description |
| --- | --- |
| $DB_t$ | Death Benefit, time t |
| $BaseTerm_t$ | Face Amount of Term Rider on Base Insured, time t |
| LBAP | Living Benefit Specified Percentage |
| $LBAAB_t$ | Living Benefit Acceleration, Amount Basis time t |
| $LMBA_t$ | Lifetime Benefit Amount, time t |
| $BPA_t$ | Benefit Payment Amount, time t |

Figure 5:
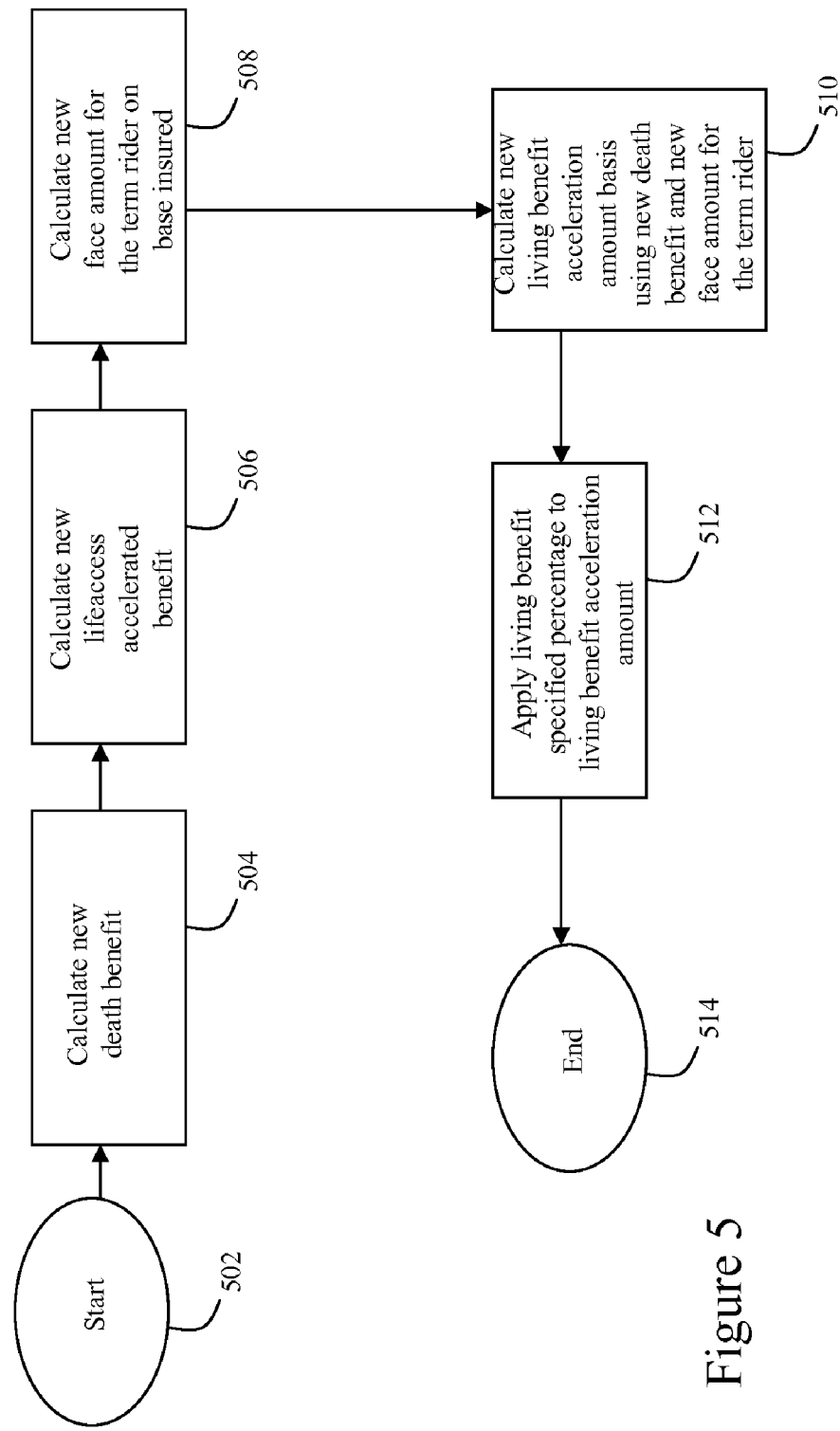
FIG. 5 is a flow chart depicting the steps taken when periodically recalculating the lifetime benefit amount in accordance with an embodiment of the present invention.

$LBAAB_t = DB_t + BaseTerm_t$
$LMBA_t = LBAP * LBAAB_t$, rounded to the nearest dollar FIG. 5 depicts the steps taken when periodically recalculating the lifetime benefit amount in accordance with an embodiment of the present invention. The procedure starts in step 502, first the new death benefit is calculated in step 504, next the new lifeaccess accelerated benefit is calculated in step 506. Subsequently, the new face amount for the term rider in base insured is calculated in step 508, then the new living benefit acceleration amount basis is calculated using new death benefit and new face amount for the term rider in step 510. Finally, the living benefit specified percentage is applied to the living benefit acceleration amount in step 512 and the procedure then ends in step 514.

It should be noted that if a policy change is requested after issue that would drop the lifetime benefit amount below $100,000, the insurance provider may allow or prohibit this change according to the insurance provider's discretion.

Although an amount of $100,000 has been presented herein, this is done for illustrative purposes only, the insurance provider may choose to set the lifetime benefit amount limit lower or higher, or set no limit at all without departing from the spirit of the present invention. The $100,000 minimum limit for the lifetime benefit amount may be for time of issue only.

The lifetime benefit amount may change while a claim is being handled. It will change because when a benefit payment is made a dollar-for dollar reduction to the lifetime benefit amount takes place as follows.

$LMBA_t = LMBA_{t-1} - BPA_t$

Figure 6:
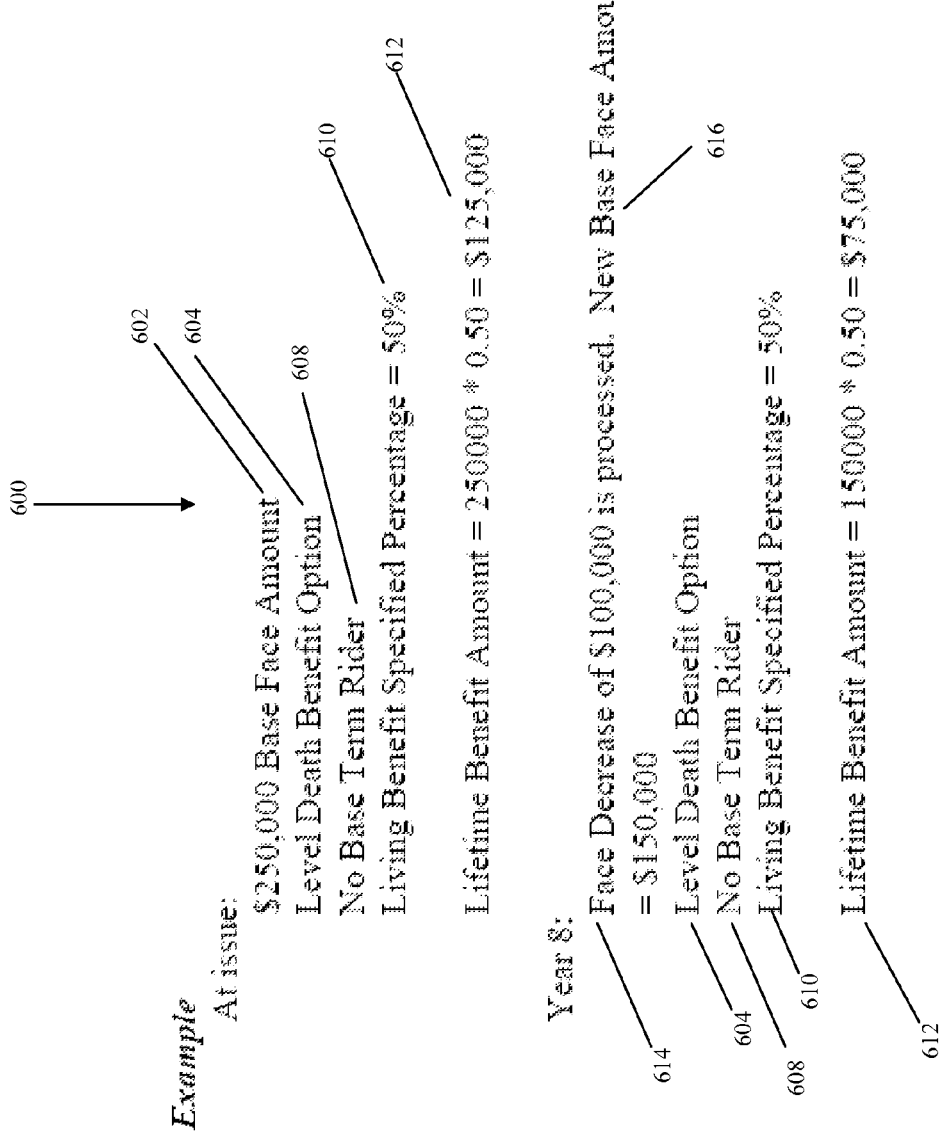
FIG. 6 is a chart depicting an example of several key values for an insurance product in accordance with an embodiment of the present invention.

An example of this is depicted in FIG. 6. FIG. 6 depicts an example of several key values used in this calculation. The sample insurance product 600 has a $250,000 base face amount 602, it has a level death benefit option 604, no base term rider 608, a living benefit specified percentage of 50% 610, and $125,000 lifetime benefit amount 612. The lifetime benefit amount 662 is calculated by multiplying the living benefit specified percentage 660 by the base face amount 602.

In this example the insurance product values for the 8$^{th}$ year of the insurance product are depicted. A $100,000 face decrease 614 is processed, the new base face amount 616 then becomes $150,000. The lifetime benefit amount 612 then becomes $75,000.

Figure 7:
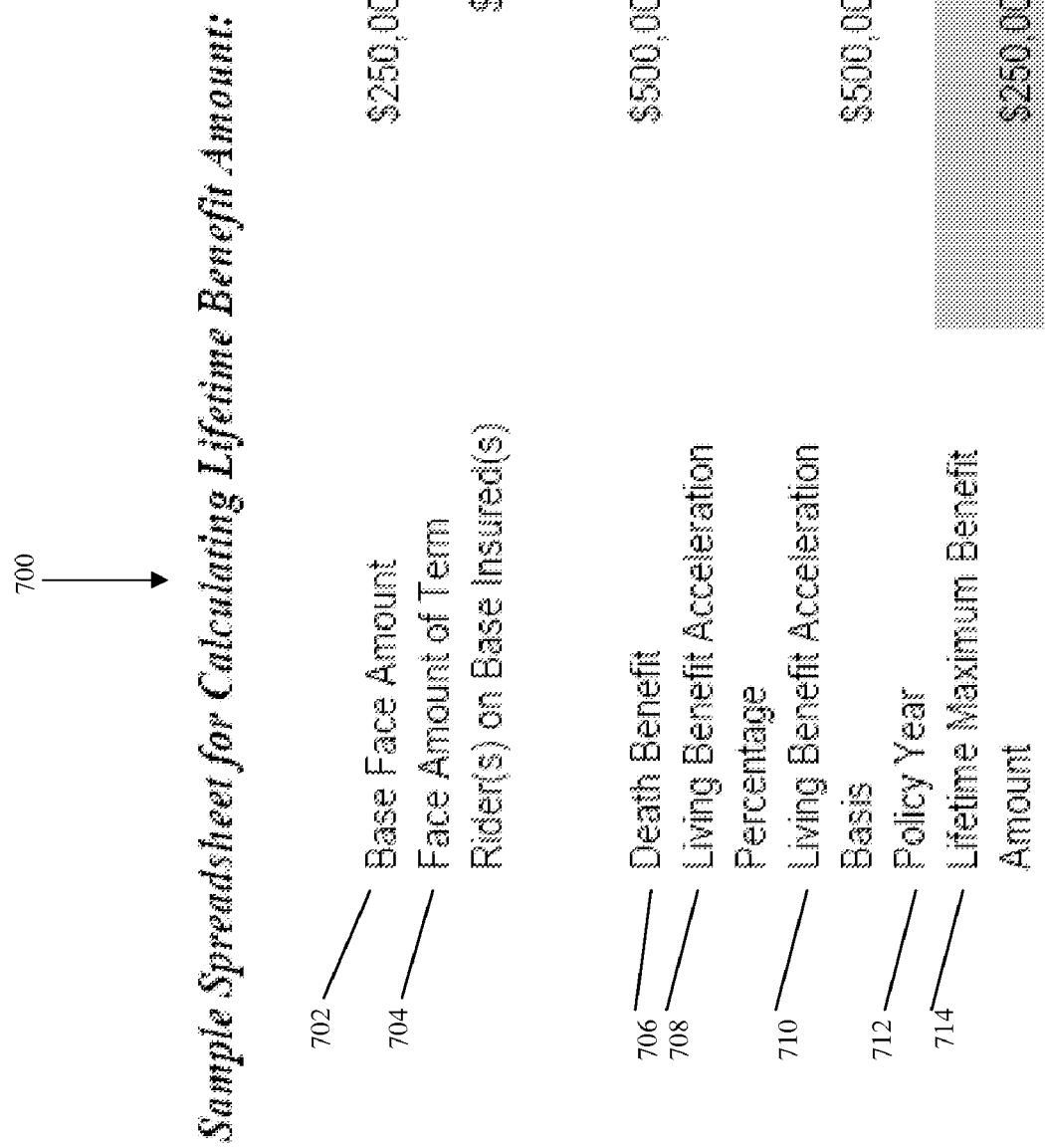
FIG. 7 is a sample spreadsheet for calculating lifetime benefit amount in accordance with an embodiment of the present invention.

FIG. 7 depicts a sample spreadsheet 700 for calculating lifetime benefit amount in accordance with the above example. The sample spreadsheet 700 for calculating lifetime benefit amount has a $250,000 base face amount 702, $0.00 face amount of term rider(s) on base insured(s) 704, a $500,000 death benefit 706, a 50% living benefit acceleration percentage 708, a $500,000 living benefit acceleration basis 710, the policy year 712 is 1, and a $250,000 lifetime maximum benefit amount 714.

The living benefit specified percentage may be restricted to a flat whole percentage with no decimal places (i.e. an integer), or it may be a number with multiple decimal places. The maximum monthly benefit amount is the maximum benefit amount to be paid, per month, to the insured individual if this rider is exercised. The maximum monthly benefit amount may be a calculated value. The insured individual, at time of claim, may be allowed to choose any monthly benefit amount, the amount may be less than or equal to the maximum monthly benefit amount. However, the amount may not have a limit placed on it at all. This value may need to be calculated at periodically, for example the value may be calculated:

At issue.

On policy anniversary each year.

In the event of any face and/or death benefit option change, as well as in the event of changes to the term rider on base insured, if one is included.

At the time of the initial claim.

While on claim.

In the preferred embodiment, this value will not be recalculated on a monthly basis while the policy is on claim, but instead on each claim anniversary. The maximum monthly benefit amount at any time t is defined to be the minimum of factors A, B, and C. Where factor A is calculated as follows:

2%*(current death Benefit+current Term Rider on Base Face Amount)*living benefit specified percentage.

While on claim, factor A will remain stable and be determined as:

2%*(death benefit at the time the claim began+term rider on base face amount at time claim began) *living benefit specified percentage In this example, the 2% value remains the same as at the beginning of the claim period and it does not change during claim. Factor B is the monthly equivalent of the maximum per diem amount at time t. C is the monthly equivalent of the maximum per diem amount at policy issue (e.g. $260 today), compounded at a 4% rate on an annual basis.

The compounding completed in the calculation of item C above is preferably done on an annual basis, however this calculation may be made more or less often without departing from the spirit of the present invention. In the event that a claim occurs at any other time, the value used for item C above may be the value as of the last policy anniversary prior to the claim.

For example, if an insurance product according to the present invention is issued as follows:

$500,000 base face amount, level death benefit option.

No term rider on base insured.

Total face amount=$500,000.

Living benefit specified percentage=100%.

Lifetime benefit amount=$500,000*1.0=$500,000

Monthly benefit amount is $6200

This example assumes a level death benefit option. In the tenth policy year, the insured individual qualifies for the benefits under the accelerated death benefit. This benefit will be paid out as depicted in table 2 below:

| Policy Year | Month in Policy Year | Age | Planned Premium | LTC Benefit Paid | Cumulative LTC Benefits Paid | Death Benefit |
|---|---|---|---|---|---|---|
| 10 | 1 | 45 | $25,000.00 | $6,200.00 | $6,200.00 | $493,800.00 |
| 10 | 2 | 45 | | $6,200.00 | $12,400.00 | $487,600.00 |
| 10 | 3 | 45 | | $6,200.00 | $18,600.00 | $481,400.00 |
| 10 | 4 | 45 | | $6,200.00 | $24,800.00 | $475,200.00 |
| 10 | 5 | 45 | | $6,200.00 | $31,000.00 | $469,000.00 |
| 10 | 6 | 45 | | $6,200.00 | $37,200.00 | $462,800.00 |
| 10 | 7 | 45 | | $6,200.00 | $43,400.00 | $456,600.00 |
| 10 | 8 | 45 | | $6,200.00 | $49,600.00 | $450,400.00 |
| 10 | 9 | 45 | | $6,200.00 | $55,800.00 | $444,200.00 |
| 10 | 10 | 45 | | $6,200.00 | $62,000.00 | $438,000.00 |
| 10 | 11 | 45 | | $6,200.00 | $68,200.00 | $431,800.00 |
| 10 | 12 | 45 | | $6,200.00 | $74,400.00 | $425,600.00 |

In the above example, at the end of year 10, the lifetime benefit amount will have been reduced down to the amount of $425,600.

In general, at the time of a claim, the insured individual will have the right to choose to receive his/her entire benefit amount as a single lump sum payment. This lump sum payment amount will generally be determined at the time of claim and will be based on the lifetime benefit amount and the maximum monthly benefit amount. The lump sum payment amount will be determined as the sum of 12 maximum monthly benefit payments multiplied by a discount factor. The lump sum will be paid out on a one-year basis.

The waiting period (also known as the elimination period) is a key feature of the present invention. This is a predetermined period (e.g. 90 days) from date that the company is first informed that the insured individual has been certified to be chronically ill, as defined by the present invention, that the insured individual must wait until he/she can first receive his/her benefits.

In one embodiment of the present invention benefits do not accumulate during the waiting period and are not retroactively applied to cover this period. However, alternatively benefits may accumulate during this period and retroactively applied to cover this period without departing from the spirit of the present invention.

The present invention may be issued in conjunction with other riders without conflict and without explicit changes to those riders, whether it is issued as a stand alone policy or as a rider to an already existing policy. In one embodiment there are no restrictions in rider combinations that would include the present invention. Alternatively, restrictions maybe placed as to which riders and/or policy types the present invention can be combined with.

In order to qualify for going on claim under the accelerated death benefit and receive benefits under the present invention, the insured may be required to meet a certain set of specific criteria. For example, criteria such as the following criteria:
  Fail 2 Activities of Daily Living ("ADLs") or cognitive impairment.
  Be under a doctor-prescribed plan of care.
  Eligible for or needing care provided by home health care, assisted living facility, nursing home, adult day care.

The above criteria are provided for illustrative purposes only, other criteria can be implemented without departing from the spirit of the present invention.

In one embodiment, the insured individual's disability may additionally need to be deemed permanent, meaning no recovery is expected in order to qualify for the benefits under the present invention, a plan of care may be required. However, in other embodiments of the present invention such a qualification may not be necessary.

The insured individual may be allowed to make a claim against the present invention at any time during the life of the policy. In order to qualify to receive benefits under the present invention as the result of this claim, the insured individual may be required to meet the requirements listed above. In addition, the insured individual may be requested wait until the end of the waiting period, and until the insurance provider has completed an assessment of the claim made, to receive any benefit amount. Alternatively, such requirements may be waived.

It should be noted that, if the assessment extends past the end of the waiting period; the first benefit amount will include any benefit amount that would have accrued between the end of the waiting period and the completion of the assessment. The system of the present invention will record at least the following two dates when a claim is filed:
  Claim Effective Date—This is the date on which the first benefit payment will be made. This may be the policy monthly anniversary date. It should be noted that the first benefit payment may be larger than a single month's worth of benefit in the event that the waiting period ended prior to this date. This date may be used as the basis for the claim anniversary date each year.
  Certification Date—This is the effective date of the certification that the insured individual is chronically ill. Re-certification may be required every 12 months.
  For example, if a claim was filed in accordance with the present invention and had the following parameters:
  Policy Date=Mar. 1, 2006
  Certification of chronic illness received by The Hartford: May 1, 2007
  waiting Period begins May 1, 2007, will end 90 days later, on Jul. 30, 2007.
  Assessment process begins on May 15, 2007.
  Assessment process ends Aug. 15, 2007.
  Insured individual will accrue daily benefits between Jul. 31, 2007 and Aug. 15, 2007.

In this case the insured individual will be eligible to receive the first benefit payment on the monthly anniversary on or after Jul. 31, 2007 (i.e. Aug. 1, 2007). The waiting period would have ended in this example even though the assessment period has not. The insured individual will be paid for those days. However, because the next monthly anniversary date is not until Sep. 1, 2007, no benefit payment will be made until Sep. 1, 2007. On Sep. 1, 2007, the benefit payment made will be the daily amount accrued from Jul. 31, 2007 through and including Aug. 30, 2007 inclusive.

The insured individual is considered as being "on claim" under the present invention once the waiting period ends (e.g. day 91) and the first benefit amount is determined. Charges for the present invention may continue to be deducted while the insured individual is on claim, unless the base policy has a specific waiver from the insurance provider. Alternatively, charges may not be deducted at all.

It is conceivable that the present invention may have a minimum issue age (e.g. 20 years old), as well as a maximum (e.g. 65 years old). It is possible that, while the base product will be allowed for the insured individual, any rider offered in accordance with the present invention may be turned down.

The insurance provider may charge for the lifeaccess accelerated benefit for the life of the policy, including while the insured individual is on claim under the present invention.

The insured individual may voluntarily terminate the insurance product of the present invention at any time. In one embodiment once terminated the insurance product of the present invention cannot be re-added to the given policy. Alternatively, the insurance product of the present invention may be reinstated at any time even upon termination.

The insurance product of the present invention may have a maturity date, where the insurance product will terminate at maturity if the policy is not on claim under the rider on the date of termination. An extension for the insurance product may be offered, however the insurance provider may also chose not to offer such extensions.

The insurance product of the present invention may not terminate if the policy, while not on claim, is being kept in force as the result of an optional no lapse guarantee rider or provision. In the event that the policy is reinstated, the lifeaccess accelerated benefit will be reinstated in the same way all other riders are reinstated.

The present invention may not have a separate rate class. Additionally, it may not necessarily be assigned separate substandard table ratings or flat extras. If for example the base insured individual has a rate class of preferred non-smoker with a flat extra of $5 per year for 3 years, then the lifeaccess accelerated benefit may implicitly have a rate class of preferred non-smoker (with the $5 flat extra for three years included in the charges). However, it will not necessarily have this rate class in any explicit manner. It also could not have a separate rate class of standard non-nicotine, for example.

It is noteworthy, that if the present invention is offered as a rider it may be declined independently of the policy itself. It is equally important to note, however, that the result of offering the present invention may simply be to determine whether or not the rider will be allowed, it may not necessarily determine a risk class for the rider.

There may not be separate substandard table ratings associated with the lifeaccess accelerated benefit. However, such separate tables may be used without departing from the spirit of the present invention. The base substandard table rating may impact the lifeaccess accelerated benefit charges.

The lifeaccess accelerated benefit may be available for the same rate classes as the base product to which it is being added. It is possible that, for certain highly rated cases the insurance provider may make the lifeaccess accelerated benefit unavailable, this may take place automatically or based on the insurance provider's discretion.

If the insurance product of the present invention is offered as a rider, the lifeaccess accelerated benefit may be available for the same rate classes as the base product to which it is being added. It is possible that, for cases with higher flat extra amounts the insurance provider may make the lifeaccess accelerated benefit unavailable.

It is possible that the present invention may additionally comprise a base face amount policy limit. For example, the present invention may not be offered to policies with base face amounts below $100,000 unless the sum total of the base face amount plus face amount on term rider on base insured is greater than or equal to $100,000. Alternatively, no such limits may be imposed without departing from the spirit of the present invention.

It is possible that, for policies where the base face term face requested is greater than the retention (e.g. $5,000,000), the addition of the accelerated death benefit ("ADB") to the underlying policy or rider may be declined by the insurance provider.

There may not be a distinct death benefit option assigned to the lifeaccess accelerated benefit. Alternatively, the insurance provider may choose to offer a distinct death benefit option assigned to the lifeaccess accelerated benefit.

All death benefit options available on the given product may be permitted at issue. The insurance provider may elect to restrict the death benefit options to insurance products which include the lifeaccess accelerated benefit, however this is not required.

For all Death Benefit Options except the level death benefit option, the insurance provider may only offer one choice for the living benefit specified percentage of 100%. Alternatively, other percentages may be offered to the insured individual without departing from the spirit of the present invention. Changes to the death benefit option, the lifeaccess accelerated benefit option, and any relevant base insurance product may be allowed by the insurance provider. Alternatively, such policies or riders may be designated as static with no allowable changes to the insurance product after issue.

Premium payments may be required by the insurance provider while the insurance product is considered on claim under the lifeaccess accelerated benefit. Alternatively, premium payments may not be required while the insurance product is considered on claim. There may not necessarily be distinct surrender charges associated with the insurance product, however such charges may be added without departing from the spirit of the present invention.

The insurance provider may choose to reduce surrender charges on a proportional basis with each benefit payment. However, such reductions are not necessary in the implementation of the present invention.

There is no distinct interest rate requirement used for the present invention. However, an interest rate adjustment may be made to any amount at issue in the insurance product without departing from the spirit of the present invention.

There may not be distinct premium load requirements associated with the present invention. In one embodiment the premium loads will not be increased. However, an increase in premium load can be made without departing from the spirit of the present invention. Additionally, if the lifeaccess accelerated benefit is included in the insurance product, but the insured individual is not receiving benefits under the rider, then withdrawals are allowed as they would be on any intervening base product excluding the rider. Withdrawals, may be prohibited during claim period. In the event that an insured individual wishes to take a withdrawal while on claim, she/he may do so if she/he terminates the insurance product of the present invention immediately. Alternatively, withdrawals may be allowed without a termination requirement.

If the lifeaccess accelerated benefit is included in the insurance product but the insured individual is not receiving benefits under the lifeaccess accelerated benefit, then loans may be allowed as they would be on the relevant base product.

The insurance provider may choose to allow loans against the insurance product during claim period. In the event that there is indebtedness on the policy at the time that the policy goes on claim under the lifeaccess accelerated benefit, the indebtedness may automatically be reduced, on a monthly proportional basis, with each claim payment. The net Benefit Amount paid may also be reduced by the amount that is used to pay down the indebtedness on the insurance product.

The cost of the lifeaccess accelerated benefit may be determined using an accelerated death benefit ("ADB factor"). The ADB factor will potentially vary by any or all of the following:

Policy issue age

Gender (male, female, unisex)

These rates may be increased for any base policy substandards, as explained in detail below. Any account charges are deducted from a shadow account for the insurance product if one exists, are TBD. The shadow account does not actually contain any funds, and is generally used for calculation purposes in order to adjust the actual account value. The charges for the present invention may be deducted when the policy is not on claim under the present invention.

A waiver of monthly deduction rider may be offered along side the present invention. A claim under the waiver of monthly deduction rider may waive at least some charges for the present invention regardless of the claim status under the present invention. The charges for the present invention may also be deducted when the insurance product is on claim as long as the insurance product is not on claim under the waiver of monthly deduction rider.

The accelerated death benefit percentage of base rate may be applied to the base policy cost of insurance ("COI") rate and the results of that calculation will then be applied to the accelerated death benefit net amount at risk divided by 1000, on a monthly basis to determine the total charge for the accelerated death benefit.

The values to be used in calculating the accelerated death benefit net amount at risk are defined in table 3 below:

| Variable | Description |
| --- | --- |
| $LBA_t$ | Lifetime Benefit Amount, time t<br>It's important to keep in mind that this is defined somewhat differently before claim and while on claim - this distinction is critical in this calculation. See Lifetime Benefit Amount section for details. |
| $BaseTerm_t$ | Face Amount for Term Rider on Base Insured, time t |
| $NAR_t$ | Policy Net Amount at Risk, time t<br>This will reflect change to the NAR incurred by any policy face and/or DBO changes. Refer to the specific product's specifications for details. |
| NARInc | ADB for LTC Net Amount at Risk Increment<br>Fixed value. Currently = 10000 |
| UnitDiv | ADB for LTC Unit Divisor<br>Fixed value. Currently = 6500 |
| RatioFactor | ADB for LTC Charge Ratio Factor<br>Fixed value. Currently 1.075 |
| $LTCChrgBasis_t$ | Accelerated Death Benefit for Long Term Care Services Charge Basis, time t |
| LBAP | Living Benefit Specified Percentage |
| MinRatio | ADB for LTC: Minimum Ratio for LTC Charge<br>Fixed value. Currently = 0.1 |
| C | ADB for LTC Benefit Size Discount Factor<br>Calculated value |
| D | ADB for LTC NAR<br>Calculated value |

The formula for the accelerated death benefit net amount at risk is defined as follows:

$$LTCChrgBasis_t = C*D$$

where $$C = MIN(MAX((RatioFactor-((LBA_t)/1000)/UnitDiv), MinRatio),1)$$

and $$D = ((((NAR_t + BaseTerm_t)*LBAP)NARInc)/1000)$$

It is important to note that the "C" value is generally a value between MinRatio and 1, inclusive. An illustrative example of an accelerated death benefit net amount at risk calculation is depicted below in table 4:

| | |
| --- | --- |
| $LBA_t$ | $5,000,000.00 |
| $BaseTerm_t$ | $ 150,000.00 |
| $NAR_t$ | $3,800,952.36 |
| NARInc | $ 10,000.00 |
| UnitDiv | $ 6,5000.00 |
| RatioFactor | 1.07500 |
| $LTCChrgBasis_t$ | 607.09752427 |
| LBAP | 50% |
| MinRatio | 0.10 |
| C | 0.30576923 |
| D | $ 1,985.47618000 |

There is generally no increase to the accelerated death benefit percentage of base COI rate for any term rider on the base insurance product. However, in an alternative implementations of the present invention an increase to the accelerated death benefit percentage of base COI rate for any term rider on the base insurance product may be implemented.

Since the accelerated death benefit net amount at risk is partly based on the term rider on base insured face amount (if any), the insured individual may incur charges on the accelerated death benefit, if one is included in the insurance product.

The values to be used in calculating the accelerated death benefit charge are defined in table 5 below:

| Variable | Description |
| --- | --- |
| t | Policy Month |
| $COI_t$ | Base Policy Cost of Insurance Rate, time t<br>This would also include increases for substandard ratings, as appropriate.<br>See specific product's specifications for Cost of Insurance for more information. |
| LTCFactor | Accelerated Death Benefit for Long Term Care Rider Factor.<br>This will be a table-driven rate.<br>At this time, this rate will be issue-aged base and will not change over the life of the policy. |
| $LTCChrgBasis_t$ | Accelerated Death Benefit for Long Term Care Services Charge Basis, time t |
| $LTCRate_t$ | Accelerated Death Benefit for Long Term Care Services Rate per $1000 of LTC Net Amount at Risk, time t<br>This rate will calculated - see below |
| $LTCCharge_t$ | Total Charge for Accelerated Death Benefit for Long Term Care Services, time t |

The formula for the accelerated death benefit charge is defined as follows:

$$LTCRate_t = COI_t * LTCFactor$$

and $$LTCCharge_t = LTCRate_t * LTCChrgBasis_t$$

In general, the ADB for LTC charge should be calculated and treated exactly like the base policy cost of insurance charge. For that reason, the insurance provider may handle scheduled and unscheduled increases differently, as demonstrated through several examples below. It should be noted that both scheduled and unscheduled increases may determine the LTC Charge on a segment-by-segment basis.

An example of ADB for LTC Charge determination scheduled face increase is described below, all specific values are discussed below for illustrative purposes only and should not serve to limit the invention as the present invention may be applied to a wide variety of values.

On a scheduled increase, COI rates for the increase coverage are point-in scale rates, so the increase piece and the base policy will be charged the same COI rates. In this example, point-in scale rates for the determination of the LTC percentage of base COI Rate for the increase may also be used.

In this example the insurance product of the present invention takes on the following values:

Policy Month 49 (Year 5 month 1)
$Base_t = \$500,000$
$BaseTerm_t = \$150,000$
LBAP=50% (0.50)
$SchedInc_t = \$250,000$
$DB_t = \$750,000$
$NAR_t = 675,159.62$ = policy-level NAR, including face increase
$COI_t = 0.3575$ = Scheduled face increases use point-in-scale COI rates, so increase uses this same rate.
LTCFactor=0.525=Delivered in a table, based on policy issue age—the insurance provider may use point-in-scale rates for scheduled increases here as well (i.e. based on base issue age)

Thus, the LTC charge for the original base policy calculations are as follows:

BaseNAR=675159.62−250000=425159.62

BaseDB=500000

BaseCOI=0.3575

LTCFactor for base=0.525

LTCRate for base=0.525*0.3575=0.1876875

LTCChrgBasis for base=MIN(MAX((1.075−(500+150)*0.50/6500,0.1),1)* ((425159.62+150000)*0.50+10000)/1000=1*297.57981=297.57981

LTC Charge for base=0.1876875*297.57981=55.85

Consequently, the calculations for LTC Charge for the increase segment are as follows:

Incr1NAR=250000

Incr1DB=250000

Incr1COI=BaseCOI=0.3575

LTCFactor for incr1=LTCPerc for base=0.525

LTCFactor for incr1=0.525*0.3575=0.1876875

LTCChrgBasis for incr1=MIN(MAX(1.075−(250)*0.5/6500,0.1),1)* ((250000*0.50)+10000)/1000=1*135=135

LTC Charge for incr1=0.1876875*135=25.34

LTCCharget=Charge for base+Charge for increase segment=55.85+25.34=81.19

Below is an example of ADB for LTC Charge determination for an unscheduled face increase. On an unscheduled increase, the insurance provider may build a new face segment for the added face amount. COI rates for the increase segment will be based on the insurance product's attained age at the time of the face increase (i.e. the "issue age" for the increase segment), beginning with duration 1. The increase coverage and the base policy may be charged a different rate.

In following this methodology, the insurance provider may calculate the ADB for LTC charge on a segment-by-segment basis. For the increase segment(s), the insurance provider may pull the associated rates, including the base COI rate and the LTC percent of base COI rate, using the issue age for the increase segment(s), not the policy issue age.

The policy's net amount at risk may be split just as it is for the base COI calculation, so the face amount for the increase segment will equal the NAR associated with that segment, and the difference between the whole policy NAR and the increase segment NAR will be the NAR for the base coverage. The insurance provider may choose to pro-rate the death benefit across the segments in the same manner.

In this example the insurance product of the present invention takes on the following values:

Policy Month 49 (Year 5 month 1)
$Base_t = \$500,000$
$UnschedInc_t = \$250,000$
$BaseTerm_t = \$150,000$
LBAP=0.50 (50%)
$DB_t = \$750,000$
$NAR_t = 675,159.62$ = policy-level NAR, including face increase
$BaseCOI_t = 0.3575$
$Incr1COI_t = 0.225$
LTCFactor for base=0.525
LTCFactor for increase segment=0.35

Thus, the LTC charge for the original base policy calculations are as follows:

BaseNAR=675159.62−250000=425159.62

BaseDB=500000

BaseCOI=0.3575

LTCFactor for base=0.525

LTCRate for base=0.525*0.3575=0.1876875

LTCChrgBasis for base=MIN(MAX((1.075−(500+150)*0.50/6500,0.1),1)*((425159.62+150000)*0.50+10000)/1000=1*297.57981=297.57981

LTC Charge for base=0.1876875*297.57981=55.85

Consequently, the LTC Charge for the increase segment calculations are as follows:

Incr1NAR=250000

Incr1DB=250000

Incr1COI=0.225

LTCFactor for incr1=0.35

LTCRate for incr1=0.35*0.225=0.07875

LTCChrgBasis for incr1=MIN(MAX(1.075−(250*0.5)/6500,0.1),1)*(250000*0.50+10000)/1000=135

LTC Charge for incr1=0.07875*135=10.63

LTCCharge$_t$=Charge for base+Charge for increase segment=55.85+10.63=66.48

Some values may be impacted by the inclusion of the accelerated death benefit. For example, the face value and the account value of the insurance product may be reduced when the insured individual or group receive lifeaccess accelerated benefits under the insurance product of the present invention. In the preferred embodiment the values are reduced proportionally. However, in an alternative embodiment the values may be reduced using a dollar for dollar reduction.

The proportional reductions described above are calculated using the reduction ratio. The reduction ratio may be applied to the given insurance product value at the time of the benefit payment to determine the new policy value after the benefit payment as been made. The reduction ratio is determined based on the ratio between the benefit payment made and the death benefit plus the term rider on base face amount on the policy prior to that benefit payment. The reduction ratio is calculated as follows:

$$RedRatio_t=1-[(LTCB_t/(DB_t+BaseTerm_t))]$$

The Reduction Ratio may not necessarily include the living benefit specified percentage. Proportional reductions are similar to a traditional face decrease, with some differences. Some of these differences are as follows:

- It is not only the face amount that may be reduced. As shown above, many other insurance product values are reduced. These proportional reductions are triggered by benefit payments made when the insurance product is on claim under the accelerated death benefit.
- The proportional reductions may be made on a monthly basis. A monthly report summarizing the changes to these values may be mailed along with the benefit payment (or, in the event that a safe haven account is used, the report may be sent on its own).
- The reduction is based on the reduction ratio.
- The face amount on the insurance product may be reduced on a proportional, not dollar-for-dollar, basis. Alternatively, the face amount on the insurance product may be reduced on a dollar for dollar basis. The f for death benefit option A cases, this will (unless in corridor) result in a dollar-for-dollar reduction by the benefit amount, but otherwise, this will not be a true dollar-for-dollar reduction.
- X This reduction may occur on a periodic (e.g. monthly) basis, given that the claim payments may be made periodically (e.g. monthly).
- X There are two exceptions to this rule. In the event of a death claim or a surrender of the insurance product, the appropriate reduction may be made to the face amount (and, consequently, death benefit) at the time of the death claim or insurance product surrender, even if such an event occurs mid-month.
- The account value may be reduced on a proportional basis given the death benefit amount and the benefit amount paid out over the current year.

The reduction in face amount, account value, and cumulative premiums will result in a reduction in the death benefit.

The insurance provider may not necessarily recalculate the maximum monthly benefit amount because of a proportional reduction triggered by a benefit payment.

In the event of indebtedness on the insurance product, the proportional reduction will also reduce the insurance product indebtedness. This reduction in indebtedness will result in a reduction in the net lifeaccess accelerated benefit amount received by the insured individual.

Ideally, in the event of an accelerated death benefit claim, the insurance provider may process the transactions and calculate values in the following order:
- Make the benefit payment for the given month.
- Reduce the values above by applying the reduction ratio to each of them.
- Determine the monthly deduction amount for that particular month (using the reduced values).

The spreadsheet depicted in FIG. 8 gives an example of how the proportional reduction at the time of a benefit payment will affect the key insurance product values. Not all insurance product values are included in the figure as the figure presents a specific example for illustrative purposes only.

FIG. 8 depicts a sample table 800, depicting the values before the claim payment 802 and values after claim payment 804 for the insurance product. Several values are depicted in the sample table 800, such as base face amount 806, term rider on base face amount 808, account value 810, death benefit 812, cash value 814, cash surrender value 816, net amount at risk 818, guideline level premium 820, MEC (7-pay) premium 822, no lapse guarantee premium 824, living benefit acceleration percentage 825, a death benefit option 826, lifetime maximum benefit amount remaining 828, claim payment 830, and a reduction ratio 832.

As depicted in the sample table 800, nearly all of the values of the insurance product are reduced as a result of a claim payment (with the exception of the reduction ratio and the living benefit acceleration percentage). For example, the base face amount 806 is $100,000 prior to the claim, and decreased to $93,800 afterwards.

Another example can be seen in the decrease in the cash value 814 for the insurance product, prior to the claim the cash value 814 for the insurance product is $88,252.60, after the claim payment the cash value 814 for the insurance product is reduced to $82,780.94. An examination of the other values depicted in table 800 and described above will reveal that these values have been reduced proportionally.

However, in an alternative embodiment a dollar for dollar reduction approach may be used without departing from the spirit of the present invention. The reduction to the accumulated value will be a proportional reduction, done on periodically (e.g. a monthly basis), and based on the lifeaccess accelerated benefit amount paid out that month and the death benefit as of the end of the previous month. These two items may be used to determine the reduction ratio, which will then be applied to the accumulated value to determine the amount by which it will be reduced.

As a result several values are adjusted as a reduction is performed periodically. Several noteworthy values and the methods by which they are calculated are described in detail below.

In one embodiment, the base face amount will be reduced, on a monthly basis, using the proportional reduction approach. The values to be used in calculating the reduction to the base face amount are defined in table 6 below:

| Variable | Description |
| --- | --- |
| $LTCB_t$ | Long Term Care Monthly Benefit Amount paid in month t |
| $BaseFace_t$ | Base Face Amount, month t |
| $DB_t$ | Death Benefit Amount, time t |
| $BaseTerm_t$ | Term Rider on Base Insured Face Amount, time t |
| $RedRatio_t$ | Reduction Ratio, time t |

The reduction to the base face amount is calculated as follows:

$$BaseFace_t = BaseFace_t * RedRatio_t$$

The values to be used in calculating the reduction to the accumulated value are defined in table 7 below:

| Variable | Description |
| --- | --- |
| $LTCB_t$ | Long Term Care Monthly Benefit Amount paid in month t |
| $DB_t$ | Death Benefit Amount, month t |
| $AV_t$ | Account Value, month t |
| $BaseTerm_t$ | Term Rider on Base Face Amount, time t |
| $RedRatio_t$ | Reduction Ratio, time t |

The reduction ratio is calculated as follows:

$$RedRatio_t = 1 - [LTCB_t / (DB_t + BaseTerm_t)]$$

Furthermore, the account value at month t is calculated as follows:

$$AV_t = AV_{t-1} * RedRatio_t$$

After the proportional reduction of the account value is completed, the monthly processing will continue as specified for the given insurance product.

The surrender charges of the insurance product may be proportionally reduced upon payment of each benefit amount while the insurance product is on claim under the accelerated death benefit.

The values to be used in calculating the surrender charge value are defined in table 8 below:

| Variable | Description |
| --- | --- |
| $LTCB_t$ | Long Term Care Monthly Benefit Amount paid in month t |
| $DB_t$ | Death Benefit Amount, month t |
| $SC_t$ | Surrender Charge, month t |
| $BaseTerm_t$ | Term Rider on Base Face Amount, time t |
| $RedRatio_t$ | Reduction Ratio, time t |

The surrender charge is calculated as follows:

$$SC_t = SC_{t-1} * RedRatio_t$$

If and when the insurance product goes on claim under the accelerated death benefit, the insurance product's death benefit will be reduced to reflect the removal of the amount paid under the claim ("benefit amount").

The methodology used for this reduction will be a proportional reduction approach. The same methodology will be used regardless of the death benefit option on the insurance product. Alternatively, the methodology may be altered as a death benefit is applied.

Since proportional reductions are performed on the base face amount, account value, and cumulative premiums, if the proportional reductions was performed on those pieces first, then it should not be performed a second time when the death benefit is determined using those values.

Alternatively, the proportional reductions may be performed at any time as many times as a particular implementation of the present invention calls for. The method of calculating the death benefit amount at a specific time is discussed in great detail below.

The values to be used in calculating the death benefit amount value are defined in table 9 below:

| Variable | Definition |
| --- | --- |
| X | Policy Year |
| T | Policy Month |
| $LTCB_t$ | Gross Monthly Benefit Amount, time t |
| $BaseTerm_t$ | Term Rider on Base Face Amount, time t |
| $DB_t$ | Death Benefit Amount, time t This assumes any adjustments for Minimum Death Benefit requirement (7702). |
| $RedRatio_t$ | Reduction Ratio, time t |

The death benefit amount is calculated as follows:

$$DB_t = DB_{t-1} * RedRatio_t$$

It is important to note that on the initial claim date, the lifetime benefit amount will be determined and locked for the duration of the claim (even in the event that the insured individual goes on and off of claim due to late recertification).

The insurance provider will then use this locked-in lifetime benefit amount to make sure that the pay out is not in excess for the life of the claim. The total amount paid over the life of the claim should in general not exceed this locked-in lifetime benefit amount.

Outstanding indebtedness on the insurance product at the time that the policy goes on claim under the accelerated lifeaccess accelerated benefit may be paid down on a proportion reduction basis. The reduction of the indebtedness will result in a comparable reduction in the benefit amount received by the insured individual while on claim.

In another embodiment, the present invention may additionally comprise a preferred loan provision, where the insurance provider will continue to re-allocation the portion of the debt that's preferred each month, using the proportionally reduced account value and the proportionally reduced cumulative premiums paid to date.

The values to be used in calculating the indebtedness and net lifeaccess accelerated benefit amount paid in a month are defined in table 10 below:

| Variable | Description |
| --- | --- |
| $LTCB_t$ | Gross Monthly Benefit Amount paid in month t |
| $DB_t$ | Death Benefit Amount, month t This assumes any adjustments for Minimum Death Benefit requirement (7702). |
| $Debt_t$ | Policy Indebtedness, month t |
| $BaseTerm_t$ | Term Rider on Base Face Amount, month t |
| $NetLTCB_t$ | Net Accelerated Benefit Rider Benefit Amount paid in month t |

The indebtedness and net lifeaccess accelerated benefit amount paid in a month are calculated as follows:

$$Debt_x = Debt_{x-1} * RedRatio_x$$

and $$NetLTCB_x = LTCB_x - (1 - RedRatio_x) * Debt_x$$

An additional payment option under the present invention is known as the seven pay (MEC) premium.

Before Claim, including at issue the charges for the insurance product of the present invention will not be included in the determination of seven pay premium on insurance products where the present invention is included as a rider. This is approach keeps the death benefit and lifeaccess rider considered as a single, integrated contract.

In yet another embodiment, the present invention may be implemented as guaranteed insurance. Guaranteed insurance typically guarantees the beneficiary, insured, or owner a fixed payment benefit amount. However, the present insurance product does not require that the benefit amount be fixed, a variable benefit amount may be implemented without departing from the spirit of the present invention.

While the policy is on claim under this rider, the insurance provider may handle each befit payment in a manner comparable to a face decrease for the purposes of tax-related values. The 7-pay premium may be recalculated using the attained age decrement process. This reduction triggered by a benefit payment may not introduce a new 7-Pay period.

In one embodiment of the present invention, there may be a no lapse guarantee charge. The charge for this provision will be included in the calculation of the no lapse guarantee ("NLG") premiums. It should be added to the total rider charge ("RC") as appropriate, given the formula for given NLG Premium. The charge calculated for the lifeaccess benefit should be based on the policy face amount (instead of net amount at risk) for each year of the policy. This will insure that the NLG premium will not vary based on planned premium stream on a given policy.

While not on claim, an insurance product with the lifeaccess benefit is being kept in force solely as the result of a no lapse guarantee rider or provision, the insurance provider will not terminate the lifeaccess.

In the event that a policy goes on claim under the lifeaccess benefit and is receiving benefit payments, the no lapse guarantee premium requirement, if one exists for the given product, may not necessarily be waived. In order to keep the no lapse guarantee in effect while on claim, the insured individual will continue to need to meet the no lapse guarantee premium requirement.

The values needed for calculating the face decrease amount triggered by a lifeaccess claim payment and the cumulative no lapse guarantee premium requirement after reduction for month t are defined in table 11 below:

| Variable | Description |
| --- | --- |
| $LTCB_t$ | Gross Monthly Benefit Amount paid in month t |
| $DB_t$ | Death Benefit Amount, month t<br>This assumes any adjustments for Minimum Death Benefit requirement (7702). |
| $FaceDecrForLA_t$ | Face Decrease Amount Triggered by Accelerated Benefit Claim Benefit Payment |
| $NLGPremOld_t$ | No Lapse Guarantee Premium prior to reduction, month t |
| $NLGPremNew_t$ | No Lapse Guarantee Premium after reduction, month t<br>Recalculated as if a normal Face Decrease equal to $FaceDecrForLA_t$, was taken.<br>See specific product specification's No Lapse Guarantee sections for details on how this recalculation is done. |
| $CumlNLGOld_{t-1}$ | Cumulative No Lapse Guarantee Premium Requirement prior to reduction, month t − 1 |
| $CumlNLGNew_t$ | Cumulative No Lapse Guarantee Premium Requirement after reduction, month t |

The face decrease amount triggered by a lifeaccess claim payment and the cumulative no lapse guarantee premium requirement after reduction for month t are calculated as follows:

$$FaceDecrForLA_t = Face_{t-1} * (1 - RedRatio_t)$$

and $$CumlNLGNew_t = (CumlNLGOld_{t-1} * RedRatio_t) + NLGPremNew_t$$

The cumulative premiums may be reduced on a proportional basis, using the reduction ratio, after each benefit payment is made. The cumulative premiums may be used, among other things, for determining whether or not the policy's NLG premium requirement has been met (as applicable). These proportionally reduced cumulative premiums may also be used in determining the death benefit for return of premium death benefit option policies.

The values needed for calculating the cumulative premiums paid to date after reduction for month t are defined in table 12 below:

| Variable | Description |
| --- | --- |
| $LTCB_t$ | Gross Monthly Benefit Amount paid in month t |
| $DB_t$ | Death Benefit Amount, month t<br>This assumes any adjustments for Minimum Death Benefit requirement (7702). |
| $CumlPremOld_t$ | Cumulative Premiums paid to date prior to reduction, month t |
| $CumlPremNew_t$ | Cumulative Premiums paid to date after reduction, month t |

The cumulative premiums paid to date after reduction for month t is calculated as follows:

$$CumlPremNew_t = CumlPremOld_t * RedRatio_t$$

The calculations described above are presented herein for illustrative purposes only, the methods disclosed herein may be used with a variety of calculation methodologies for calculating specific values without departing from the spirit of the present invention. In the preferred embodiment, the calculations described above are performed on a computer system, an embodiment of such a computer system is described below.

Figure 9:
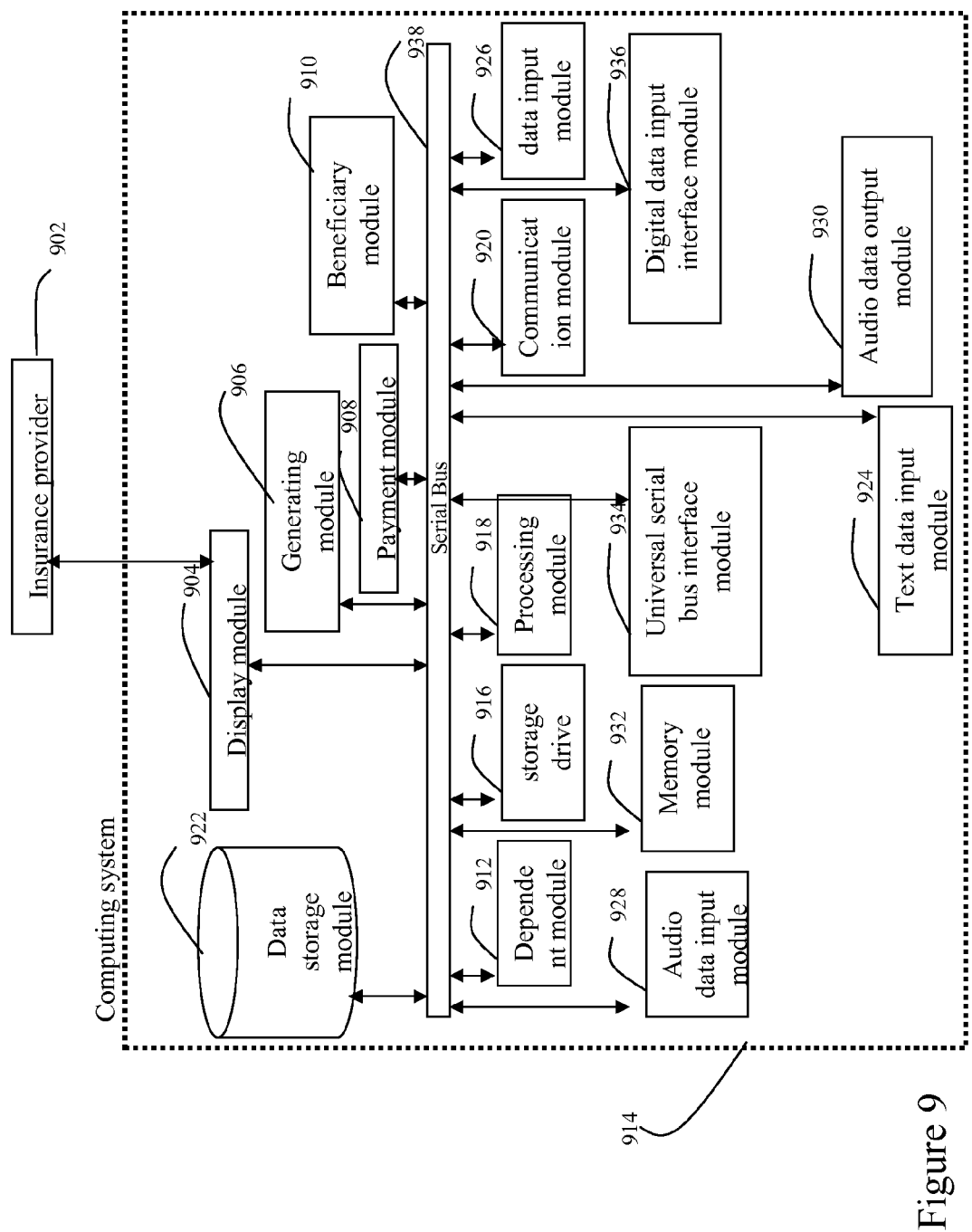
FIG. 9 is a diagram depicting the system on which the methods of the present invention may be implemented in accordance with an embodiment of the present invention.

FIG. 9 depicts a system on which the methods of the present invention may be implemented. The present invention relates to an improved accelerated access benefit insurance product management system, apparatus and method which includes at least one central processing computer or computer network server. Network server includes at least one controller or central processing unit (CPU or processor), at least one communication port or hub, at least one random access memory (RAM), at least one read-only memory (ROM) and one or more databases or data storage devices. All of these later elements are in communication with the CPU to facilitate the operation of the network server. The network server may be configured in many different ways. For example, network server may be a conventional standalone server computer or alternatively, the function of server may be distributed across multiple computing systems and architectures.

Network server may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to a communications hub or port that serves as a primary communication link with other servers, client or user computers and other related devices. The communications hub or port may have minimal processing capability itself, serving primarily as a communications router. A variety of communications protocols may be part of the system, including but not limited to: Ethernet, SAP, SAS™, ATP, Bluetooth, GSM and TCP/IP.

Data storage device may include a hard magnetic disk drive, optical storage units, CD-ROM drives, or flash memory. Data storage device contains databases used in processing transactions and/or calculations in accordance with the present invention, including at least an insurance subscriber database and an insurance database. In one embodiment, database software creates and manages these databases. Insurance related calculations and/or algorithms of the present invention are stored in storage device and executed by the CPU.

The controller comprises a processor, such as one or more conventional microprocessors and one or more supplementary co-processors such as math co-processors. The processor is in communication with a communication port through which the processor communicates with other devices such as other servers, user terminals or devices. The communication port may include multiple communication channels for simultaneous communication with, for example, other processors, servers or client terminals. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor also is in communication with a data storage device. The data storage device may comprise an appropriate combination of magnetic, optical and/or semiconductor memory, and may include, for example, RAM, ROM, flash drive, an optical disc such as a compact disc and/or a hard disk or drive. The processor and the data storage device each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wireline medium or combination of the foregoing.

The data storage device may store, for example, (i) a program (e.g., computer program code and/or a computer program product) adapted to direct the processor in accordance with the present invention, and particularly in accordance with the processes described in detail hereinafter with regard to the controller; (ii) a database adapted to store information that may be utilized to store information required by the program. The database includes multiple records, each record includes fields that are specific to the present invention such as interest rates, premiums, subscribers, payouts, claims, etc.

The program may be stored, for example, in a compressed, an uncompiled and/or an encrypted format, and may include computer program code. The instructions of the program may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as calculating a face value for the insurance product, calculating an account value for the insurance product, calculating a death benefit for the insurance product using the account value and the face value, calculating a lifeaccess accelerated benefit for the insurance product using the face value, and account value, and generating an insurance product having an account value, a face value, a death benefit, and a lifeaccess accelerated benefit. The functions described above are merely exemplary and should not be considered exhaustive of the type of function which may be performed by the computer program code of the present inventions.

The computer program code required to implement the above functions (and the other functions described herein) can be developed by a person of ordinary skill in the art, and is not described in detail herein.

The computing system 914 would generally be used by an insurance provider 902 however the system may be operated by any individual or organization offering an insurance product as outlined in the present specification without departing from the spirit of the present invention. All of the modules described herein are operably inter-connected via a bi-directional connection with a central serial bus 938. The serial bus 938 serves to receive information from every single module, as well as to transmit information from one module to another. The computing system 914 comprises: a display module 904, and a generating module 906. The generating module is used for generating an insurance product contract, wherein the insurance product contract provides at least one, benefit to an individual or group.

The computing system 914 additionally includes a payment module 908 for making periodic payments to an insured individual or group for a predetermined period of time.

The system further comprises a beneficiary module 910 for choosing a beneficiary to receive payments from the insurance provider in the instance of an insured individual's death. Furthermore, the system comprises a dependent module 912 for offering an insurance product structured according to the methods of the present invention to dependents of an individual eligible for the insurance product described herein.

Additionally, the computing system 914 includes: a storage drive 916 for receiving data stored on an optical disc, a processing module 918 for processing digital data received by and contained in the insurance product generating system 914, a communication module 920 for bi-directional communication with external and telecommunications systems, a data storage module 922 for storing and managing digital information, a text data input module 924 for inputting data in the form of text, and a data input module 926 for converting to digital format documents and images and inputting them into the computing system 914.

Finally, the computing system 914 includes: an audio data input module 928 for receiving and inputting audio information, an audio data output module 930 for outputting data in audio format (i.e. recorded speech, synthetically generated speech from digital text, etc), a memory module 932 for temporarily storing information as it is being processed by the processing module 918, a universal serial bus interface module 934 for receiving and transmitting data to and from devices capable of establishing a universal serial bus connection, and a digital data input interface module 936 for receiving data contained in digital storage devices (e.g. floppy disk, zip drive, 8 mm digital tape, etc).

The term "computer-readable medium" as used herein refers to any medium that provides or participates in providing instructions to the processor of the computing device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, LCD, voice recognition software, or other generally represented by input/output devices required to implement the above functionality. The program also may include program elements such as an operating system, a database management system and "device drivers" that allow the processor to interface with computer peripheral devices (e.g., a video display, a keyboard, a computer mouse, etc).

It is suggested that when implementing the methods of the present invention, on the described system, the insured individual may enter the living benefit specified percentage, subsequently the system on which the present invention is implemented may calculate the at-issue lifetime benefit amount. The graphic user interface ("GUI") entry would be for the living benefit specified percentage, and the lifetime benefit amount may be calculated by the system internally while only the result may be presented to the insured individual.

In conjunction with this, limits may be placed on the system of the present invention so as not to allow the user to enter a percentage that would result in a lifetime benefit amount less than a predetermined amount $100,000 at issue, such limits may be placed on any amount at issue in the present invention. Alternatively, no limits may be placed on any of the amounts of the insurance product of the present invention. If a limit is chosen and user provided data cause an excess or deficit relative to the predetermined value of the limit a user error message is issued.

For example, if an insurance product in accordance with the present invention has a face amount at issue which is $500,000, a term rider on base face amount which is $100,000, and the insured individual selects a living benefit specified percentage of 70%, the system of the present invention would calculate the lifetime benefit amount as follows:

$$0.70*(500000+100000)=\$420,000$$

The specific values used in the above example are presented for illustrative purposes. The present invention is not restricted to the above example as it may apply to a wide variety of values and calculation methods.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention.

The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

Although the invention described herein has been discussed in terms of an insurance product for exemplary purposes, it can be equally applied to any other insurance instrument. Furthermore, the invention described herein has been discussed in terms of an individual purchasing an insurance product for exemplary purposes, it can be equally applied to any individual or group purchasing an insurance product.

What is claimed is:

1. A computer system for processing data related to a life insurance policy issued by an issuer and having a death benefit payable to a beneficiary upon a death of an insured, comprising:
   a data storage device for storing data related to the life insurance policy, including a current value of the death benefit, a current amount of indebtedness on the policy, and availability of periodic payments to an owner of the policy that reduce the death benefit, the periodic payments being available during a lifetime of the insured responsive to a request including data indicative of a medical condition of the insured; and
   a processor, in communication with said data storage device, the processor configured to:
   receive data indicative of a request for periodic payments to an owner of the policy including data indicative of the medical condition of the insured;
   determine a reduction of the current value of the death benefit and a proportional reduction of the current amount of indebtedness on the policy based on one of the periodic payments and without reduction of an amount of each of the periodic payments, and provide an output signal having data indicative of the determined current value of the death benefit and the determined current amount of indebtedness on the policy.

2. The computer system of claim 1, further comprising a generating module in communication with the processor via a bus, the generating module being configured to generate one or more insurance contract documents effective to issue the life insurance policy, the documents including provisions providing for availability of the periodic payments on condition of the request including the data indicative of the medical condition of the insured.

3. The computer system of claim 1, wherein, responsive to each of the periodic payments, the current value of the death benefit is reduced by the amount of the periodic payment.

4. The computer system of claim 1, wherein, responsive to each of the periodic payments, the current value of the death benefit and the current amount of indebtedness on the policy are reduced.

5. The computer system of claim 1, wherein the processor is further configured to determine a maximum amount of the periodic payments based on a lower of (a) an amount determined based on a product of a number of days in a period for payment of periodic payments and a per diem amount and (b) an amount determined based on a product of (i) the current value of the death benefit, (ii) a percentage of the current value of the death benefit, and (iii) a periodic percentage.

6. The computer system of claim 1, wherein there is no restriction on the use by the owner of the periodic payments.

7. The computer system of claim 1, wherein the data indicative of the medical condition of the insured comprises data indicative of physical disability in the nature of inability to perform without substantial assistance from another individual at least two activities of daily living, and cognitive impairment in the nature of requiring substantial supervision from another individual to protect the insured from threats to health and safety due to a severe cognitive impairment.

8. The computer system of claim 1, wherein the processor is further configured to determine, responsive to each of the periodic payments, reduced values of a face amount of the policy, an account value of the policy, surrender charges associated with the policy, the amount of indebtedness under the policy and no lapse guarantee premiums associated with the policy, the reduced values being determined based on a reduction ratio incorporating an amount of one of the periodic payments and an available benefit amount.

9. The computer system of claim 1, wherein the processor is further configured to:
periodically determine whether the policy has a status of on claim with respect to payment of the periodic payments responsive to receipt of a request including data indicative of a medical condition of the insured;
responsive to determining that the policy does not have the status of on claim with respect to payment of the periodic payments responsive to receipt of a request including data indicative of a medical condition of the insured, deduct from an account value of the life insurance policy a charge for the availability of the periodic payments; and
responsive to determining that the policy does have the status of on claim with respect to payment of the periodic payments responsive to receipt of a request including data indicative of the medical condition of the insured, not deduct from the account value of the life insurance policy a charge for the availability of the periodic payments.

10. The computer system of claim 1, wherein the processor is further configured to:
periodically determine whether the policy has a status of on claim with respect to payment of the periodic payments responsive to receipt of a request including data indicative of a medical condition of the insured;
responsive to determining that the policy does have the status of on claim with respect to payment of the periodic payments responsive to receipt of a request including data indicative of a medical condition of the insured, compare an amount of current deductions to the account value of the life insurance policy less the current amount of indebtedness on the life insurance policy;
responsive to determining that the amount of current deductions is not greater than the account value of the life insurance policy less the current amount of indebtedness on the life insurance policy, deduct the amount of current deductions from the account value of the life insurance policy; and
responsive to determining that the amount of current deductions is greater than the account value of the life insurance policy less the current amount of indebtedness on the life insurance policy, deduct from the account value of the life insurance policy an amount not greater than the account value of the life insurance policy less the current amount of indebtedness on the life insurance policy.

11. The computer system of claim 1, wherein the processor is configured to determine the proportional reduction of the current amount of indebtedness on the policy based on one of the periodic payments by multiplying the current amount of indebtedness on the policy by a reduction ratio, a value of the reduction ratio being determined based on a value of the one of the periodic payments and a value of an available maximum amount of the periodic payments.

12. The computer system of claim 1, wherein the processor is configured to determine the proportional reduction of the current amount of indebtedness on the policy based on one of the periodic payments by multiplying the current amount of indebtedness on the policy by a reduction ratio, a value of the reduction ratio being determined based on a value of the one of the periodic payments, a current value of the death benefit, and a current value of a face amount of a term rider on the policy.

13. A computer-implemented method for processing data associated with a life insurance policy issued by an issuer and having a death benefit payable to a beneficiary upon a death of an insured, comprising:
receiving by a processor, during a lifetime of the insured, data indicative of a request for periodic payments that reduce the death benefit to an owner of the policy, the request being associated with data indicative of a medical condition of the insured;
accessing by the processor an amount of the periodic payments;
determining by the processor a reduction of a current value of the death benefit and a proportional reduction of a current amount of indebtedness on the policy based on one of the periodic payments and without reduction of each of the periodic payments; and
storing by the processor in a data storage device in communication with the processor data indicative of the determined current value of the death benefit and the determined current amount of indebtedness on the policy.

14. The computer-implemented method of claim 13, further comprising generating by a generating module in communication with the processor one or more insurance contract documents effective to issue the life insurance policy, the documents including provisions providing for availability of the periodic payments on condition of the request and the associated data indicative of the medical condition of the insured.

15. The computer-implemented method of claim 13, further comprising determining an amount of the periodic payments as equal to an amount requested by the owner and less than an available maximum amount.

16. The computer-implemented method of claim 13, further comprising, responsive to each of the periodic payments, reducing the amount of the death benefit by the amount of the periodic payment.

17. The computer-implemented method of claim 13, further comprising accessing data indicative of a term during which periodic payments continue, the periodic payments ceasing at the expiration of the term unless data indicative of continuation of the medical condition of the insured is received, and wherein the term is one year.

18. The computer-implemented method of claim 17, further comprising, at the expiration of the term, responsive to receipt of the data indicative of continuation of the medical condition of the insured, accessing data indicative of a renewal term during which the periodic payments continue.

19. The computer-implemented method of claim 13, wherein, responsive to receipt of data indicative of death of the insured, the periodic payments cease.

20. A non-transitory computer-readable medium, having processor-executable instructions thereon for processing data associated with a life insurance policy issued by an issuer and having a death benefit payable to a beneficiary upon a death of an insured, which instructions, when executed by a processor, cause the processor to:
  receive, during a lifetime of the insured, data indicative of a request for accelerated death benefits, the request being associated with data indicative of a medical condition of the insured,
  access an amount of the periodic payments;
  determine a reduction of the current value of the death benefit and a proportional reduction of a current amount of indebtedness on the policy based on one of the periodic payments and without reduction of an amount of each of the periodic payments, and
  store in a data storage device in communication with the processor data indicative of the determined current value of the death benefit and the determined current amount of indebtedness on the policy.

21. The non-transitory computer-readable medium of claim 20, wherein the data indicative of a medical condition comprises data indicative of certification by a licensed health care practitioner of at least one of physical disability and cognitive impairment of the insured.

22. The non-transitory computer-readable medium of claim 20, wherein the instructions, when executed by a processor, further cause the processor, responsive to data indicative that the death benefit is zero, provide an output signal having data indicative that the periodic payments are to cease.

23. The non-transitory computer-readable medium of claim 20, wherein the instructions, when executed by a processor, further cause the processor to transmit data relating to the periodic payments to a payment module in communication via a bus with the processor, the payment module being configured to effect the periodic payments responsive to receipt of the data relating to the periodic payments from the processor.

24. The non-transitory computer-readable medium of claim 20, wherein the policy is one of a whole life insurance policy and a universal life insurance policy.

* * * * *